(12) United States Patent
Prodić et al.

(10) Patent No.: US 8,536,842 B2
(45) Date of Patent: Sep. 17, 2013

(54) SENSORLESS SELF-TUNING DIGITAL CURRENT PROGRAMMED MODE (CPM) CONTROLLER WITH MULTIPLE PARAMETER ESTIMATION AND THERMAL STRESS EQUALIZATION

(75) Inventors: Aleksandar Prodić, Toronto (CA); Zdravko Lukić, Toronto (CA); Sheikh Mohammad Ahsanuzzaman, Toronto (CA); Zhenyu Zhao, Burlington (CA)

(73) Assignee: Exar Corporation, Fremont, CA (US)

( * ) Notice: Subject to any disclaimer, the term of this patent is extended or adjusted under 35 U.S.C. 154(b) by 273 days.

(21) Appl. No.: 13/039,776

(22) Filed: Mar. 3, 2011

(65) Prior Publication Data
US 2012/0223692 A1    Sep. 6, 2012

(51) Int. Cl.
*G05F 1/00*    (2006.01)

(52) U.S. Cl.
USPC ............................................. 323/272; 363/69

(58) Field of Classification Search
USPC ................................ 323/272; 363/65, 69, 70
See application file for complete search history.

(56) References Cited

U.S. PATENT DOCUMENTS

| 7,622,820 | B1 | 11/2009 | Prodic et al. |
| 2004/0000894 | A1* | 1/2004 | Zhang ........................... 323/225 |
| 2006/0038543 | A1 | 2/2006 | Hazucha et al. |
| 2006/0152204 | A1 | 7/2006 | Makzimovic et al. |
| 2010/0141230 | A1 | 6/2010 | Lukic et al. |
| 2010/0225287 | A1 | 9/2010 | Schultz |

OTHER PUBLICATIONS

Jabar Abu-Qahouq, et al., "Multiphase Voltage-Mode Hysteretic Controlled DC-DC Converter with Novel Current Settings", IEEE Transactions on Power Electronics, Nov. 2004, pp. 1397-1407, vol. 19, No. 6.
Jaber Abu-Qahouq, et al., "Novel Current Sharing Schemes for Multiphase Converters with Digital Controller Implementation", IEEE Applied Power Electronics Conference, Feb. 2007, pp. 148-156.
C. Basaran, et al., "Failure Modes of Flip Chip Solder Joints under High Electric Current Density", Journal of Electronic Packaging, Jun. 2005, pp. 157-163, vol. 127, ASME.
Stephane Bibian, et al., "High Performance Predictive Dead-Beat Digital Controller for DC Power Supplies", IEEE Transactions on Power Electronics, May 2002, pp. 420-427, vol. 17, No. 3.
Texas Instruments, "Digital Temperature Sensor with I2C Interface, TMP100", Jan. 2002—Revised Nov. 2007, 18 pages, Burr-Brown Products from Texas Instruments.
J. J. Chen, et al., "Integrated Current Sensing Circuits Suitable for Step-Down DC-DC Converters", Electronics Letters, Feb. 5, 2004, 2 pages, vol. 40, No. 3.
Kuo-Hsing Cheng, et al., "A High-Accuracy and High-Efficiency on-Chip Current Sensing for Current-Mode Control CMOS DC-DC Buck Converter", IEEE 15th International Electronics,Circuits and Systems Conference, 2008, pp. 458-461.

(Continued)

*Primary Examiner* — Harry Behm
*Assistant Examiner* — Matthew Grubb

(57) ABSTRACT

A multiphase controller for a DC-to-DC power supply includes logic to estimate parameters for multiple phases that provide a combined output at a load. The estimated parameters include a current estimate and an effective resistance estimates for each phase so that a power estimate for each phase can be produced. The logic adjusts the operation of the phases using the power estimate for each phase.

18 Claims, 17 Drawing Sheets

(56) References Cited

OTHER PUBLICATIONS

Enrico Dallago, et al., "Lossless Current Sensing in Low-Voltage High-Current DC/DC Modular Supplies", Dec. 2000, pp. 1249-1252, IEEE Transactions on Industrial Electronics, vol. 47, No. 6.

Simon Effler, et al., "Digital Control Law Using a Novel Load Current Estimator Principle for Improved Transient Response", Proceedings: IEEE Power Electronics Specialist Conference, 2008, pp. 4585-4589.

Alan Elbanhawy, "Current Sharing in Multi-phase Converters using Temperature Equalization", Proceedings: Power Electronics Specialist Conference (PESC) in Recife, Brazil, Jun. 16-19, 2005, pp. 1464-1468, Recife, Brazil.

Guang Feng, "A New Digital Control Algorithm to Achieve Optimal Dynamic Performance in DC-to-DC Converters", Jul. 2007, pp. 1489-1498, IEEE Transactions on Power Electronics, vol. 22, No. 4.

G. Garcea, et al., "Digital Auto-Tuning System for Inductor Current Sensing in VRM Applications", Proceedings: IEEE Applied Power Electronics Conference, 2006, pp. 493-498.

PH. Givelin, et al., "On-Chip Overcurrent and Openload Detection for a Power MOS High-Side Switch: A CMOS Current Mode Approach", Proceedings: European Conference on Power Electronics and Applications, 1993, pp. 197-200.

Lei Hua, et al., "Design Considerations of Time Constant Mismatch Problem for Inductor DCR Current Sensing Method, Proceedings: IEEE Applied Power Electronics Conference, 2006, pp. 1368-1374."

INTEL, "Voltage regulator module (VRM) and enterprise voltage regulator-down (EVRD) 11.1", Intel Design Guidelines, Sep. 2009, 62 pages, Intel Corporation.

Cheung Fai Lee, et al., "A Monolithic Current-Mode CMOS DC-DC Converter with On-Chip Current-Sensing Technique", IEEE Journal of Solid-State Circuits, Jan. 2004, pp. 3-14, vol. 39, No. 1.

Jeffrey Morroni, et al., "Design and Implementation of an Adaptive Tuning System Based on Desired Phase Margin for Digitally Controlled DC-DC Converters", IEEE Transactions on Power Electronics, Feb. 2009, pp. 559-564, vol. 24, No. 2.

Peng Li, et al., "A Design Method for Paralleling Current Mode Controlled DC-DC Converters", IEEE Transactions on Power Electronics, May 2004, pp. 748-756, vol. 19, No. 3.

Zdravko Lukic, "Design and Practical Implementation of Advanced Reconfigurable Digital Controllers for Low-Power Multi-phase DC-DC Converters", PhD Thesis, 2010, Department of Electrical and Computer Engineering, University of Toronto, Canada.

Zdravko Lukic, et al., "Digital Controller for Multi-Phase DC-DC Converters with Logarithmic Current Sharing", Proceedings: IEEE Power Electronics Specialists Conference, 2007, pp. 119-123.

Zdravko Lukic, et al., "Self-Tuning Digital Current Estimator for Low-Power Switching Converters", Proceedings: IEEE Applied Power Electronics Conference, 2008, pp. 529-534.

Hong Mao, et al., "Analysis of Inductor Current Sharing in Nonisolated and Isolated Multiphase DC-DC Converters", IEEE Transactions on Power Electronics, Dec. 2007, pp. 3379-3388, vol. 54, No. 6.

MAXIM, "7-Channel Precision Temperature Monitor", Data Sheet, 18 pages, Revised May 2009.

Thomas Meade, et al., "Parasitic Inductance Effect on Switching Losses for a High Frequency DC-DC Converter", Applied Power Electronics Conference, 2008, pp. 3-9.

Pallab Midya, et al., "Sensorless Current Mode Control—An Observer-Based Technique for DC-DC Converters", IEEE Transactions on Power Electronics, Jul. 2001, pp. 522-526, vol. 16, No. 4.

Amir Parayandeh, et al., "Programmable Analog-to-Digital Converter for Low-Power DC-DC SMPS", IEEE Transactions on Power Electronics, Jan. 2008, pp. 1719-1730, vol. 23, No. 1.

Benjamin J. Patella, et al., "High-Frequency Digital PWM Controller IC for DC-DC Converters", IEEE Transactions on Power Electronics, Jan. 2003, pp. 438-446, vol. 18, No. 1.

Hao Peng, et al., "Overload Protection in Digitally Controlled DC-DC Converters", IEEE Transactions on Power Electronics, May 2004, pp. 748-756, vol. 19.

Angel V. Peterchev, et al., "Architecture and IC Implementation of a Digital VRM Controller", Jan. 2003, IEEE Transactions on Power Electronics, vol. 18, No. 1.

H. Pooya Forghani-Zadeh, et al., "An Accurate, Continuous, and Lossless Self-Learning CMOS Current-Sensing Scheme for Inductor-Based DC-DC Converters", Mar. 2007, IEEE Journal of Solid-State Circuits, vol. 42, No. 3.

Hassan Pooya Forghani-Zadeh, et al., "Current-Sensing Techniques for DC-DC Converters", Proceedings: IEEE MWSCAS, Aug. 2002, pp. 577-580.

Aleksandar Radic, et al., "Minimum Deviation Digital Controller IC for Single and Two Phase DC-DC Switch-Mode Power Supplies", Proceedings: IEEE Applied Power Electronics Conference, 2010, pp. 1-6.

Carsten Nesgaard, "Optimized Load Sharing Control by Means of Thermal Reliability Management", 2004, Proceedings: PESC 2004, Jun. 20-25, 2004, pp. 4901-4906, Aachen, Germany.

Zhenyu Zhao, et al., "Continuous-Time Digital Controller for High-Frequency DC-DC Converters", IEEE Transactions on Power Electronics, Mar. 2008, pp. 564-573, vol. 23, No. 2.

Vahid Yousefzadeh, et al., "Proximate Time-Optimal Digital Control for Synchronous Buck DC-DC Converters", IEEE Transactions on Power Electronics, Jul. 2008, pp. 2018-2026, vol. 23, No. 4.

R. Schacht, et al., "Accelerated Active High-Temperature Cycling Test for Power MOSFETs", Proceedings: Thermal and Thermomechanical Phenomena in Electronics Systems, 2006, pp. 1102-1110.

Bogdan Tomescu, et al., "Improved Large-Signal Performance of Paralleled DC-DC Converters Current Sharing Using Fuzzy Logic Control", IEEE Transactions on Power Electronics, May 1999, pp. 573-577, vol. 14, No. 3.

S. Yuvarajan, et al., "Power Conversion and Control Using a Current Sensing Power MOSFET", Proceedings: Midwest Symposium Circuits and Systems (MWSCAS), 1992, pp. 166-169.

International Searching Authority, International Search Report and Written Opinion, Jun. 29, 2012, 10 pages.

\* cited by examiner

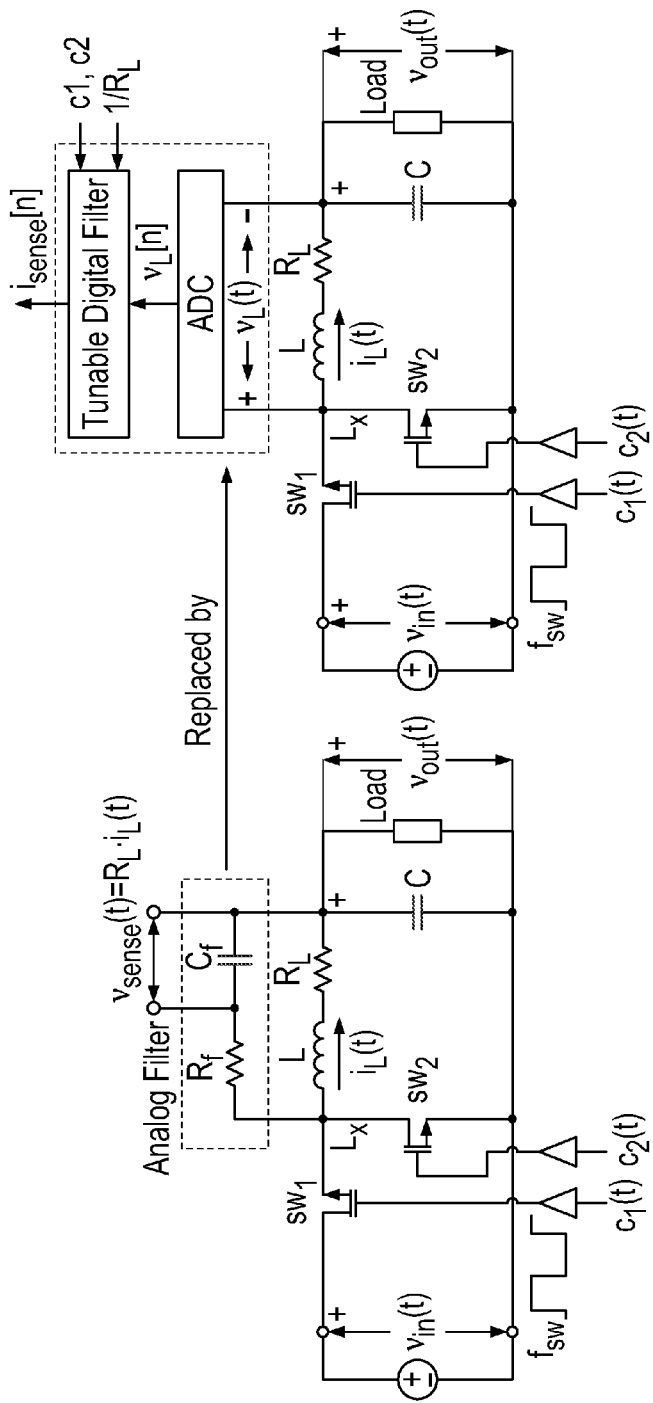
FIGURE 2A
FIGURE 2B
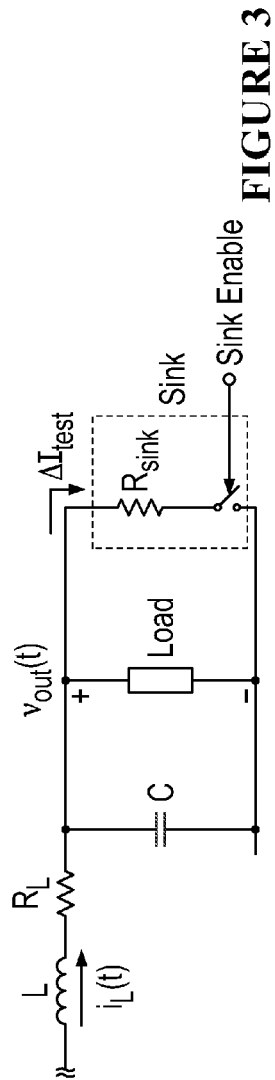
FIGURE 3

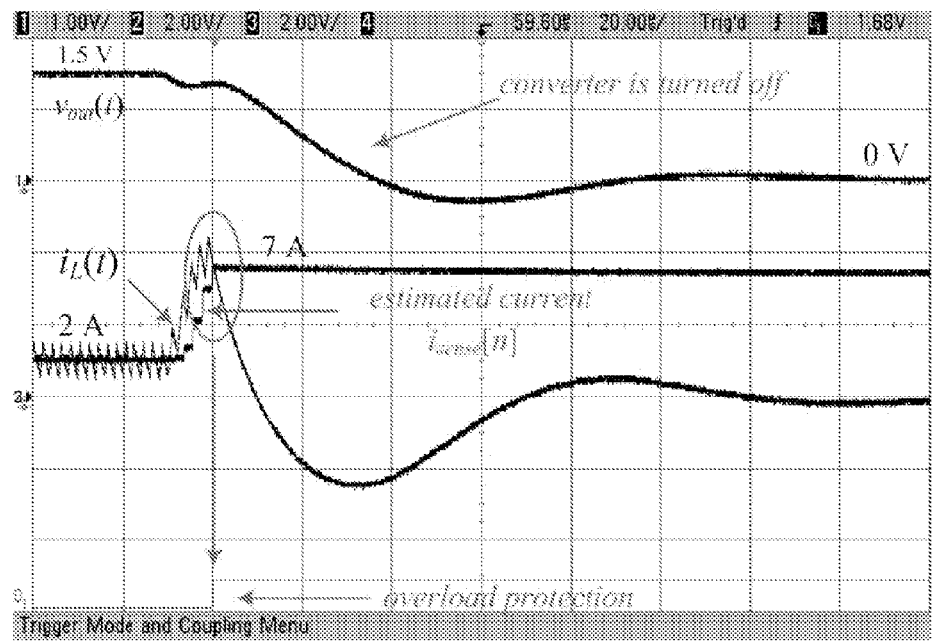
FIGURE 18
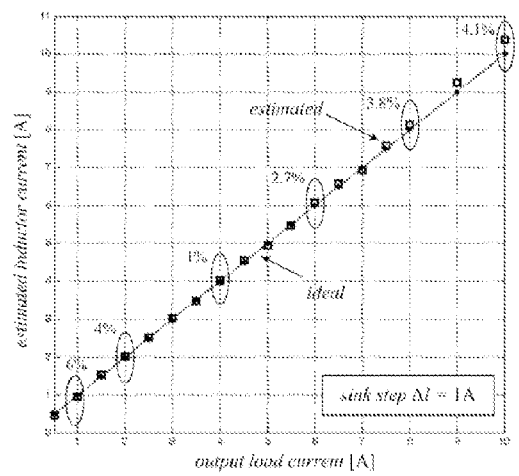
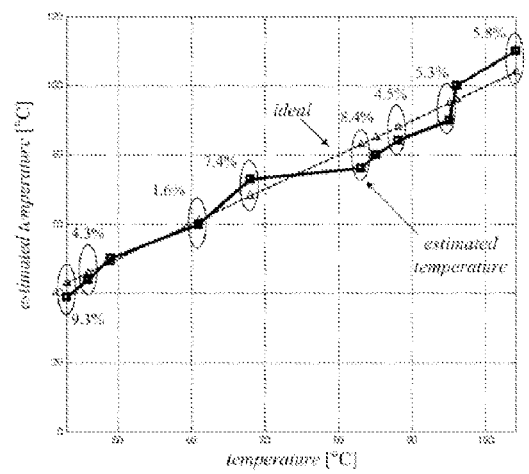
FIGURE 19A          FIGURE 19B

SENSORLESS SELF-TUNING DIGITAL CURRENT PROGRAMMED MODE (CPM) CONTROLLER WITH MULTIPLE PARAMETER ESTIMATION AND THERMAL STRESS EQUALIZATION

BACKGROUND

Multiphase DC-DC converters use multiple phases to produce current to a load of the DC-DC converter. The output of the DC-DC converter is monitored to determine the level of the output voltage provided by the phases. Typically, each phase is instructed to provide the same amount of current. The phases are designed to be identical, but process variations can result in different resistances of the phases and consequently power losses.

These different levels of power losses can result in different temperatures at the phases. Since the operation DC-to-DC converter can be cycled thousands of times a day, there can be thousands of heating and cooling periods with resultant thermal stress that can damage the power supply.

One way to compensate for the differences in operating temperature of the phases is to use a temperature sensor. However, temperature sensors are expensive. Further, the temperature sensors are typically attached to the outside of the chip package and the intervening layers of packaging can interfere with the temperature sensing.

SUMMARY

A practical average current-programmed mode (CPM) controller for multi-phase dc-dc converters operating at high switching frequencies is described. The controller accurately estimates average inductor currents and identifies main converter parameters without using external current sensors. The total conduction losses in each of the phases as well as the inductor and output capacitance values, i.e. output filter, are identified. The estimated conduction losses are used to achieve dynamic current sharing based on equal thermal stress. This increases the system reliability and eliminates the premature aging of converter phases. The extracted output filter values are also used in a proximity-time optimal response method to obtain a fast dynamic response limited only by the size of the inductor and output capacitor.

Also described is a current estimator that, during calibration, uses operation at multiple frequencies to determine accurate current estimate. Multiple preliminary current estimates at different frequencies can be made. The preliminary estimates can use a value, such as an internal duty cycle value, that does not reflect switching delays in the circuit. Since the total switching delay will be independent on frequency, the use of multiple preliminary current estimates at different frequencies can be used to determine a current offset that can be used to adjust the current estimate at the normal operating frequency.

BRIEF DESCRIPTION OF THE DRAWINGS

FIGS. 2A and B are diagrams of circuits that illustrate current sensing.

FIG. 3 is a diagram that illustrates the use of a test current circuit used for filter calibration.

FIG. 18 is a timing diagram that illustrates overload protection.

FIGS. 19A and 19B are graphs that illustrate relative errors of the current and temperature estimation.

DETAILED DESCRIPTION

Figure 1:
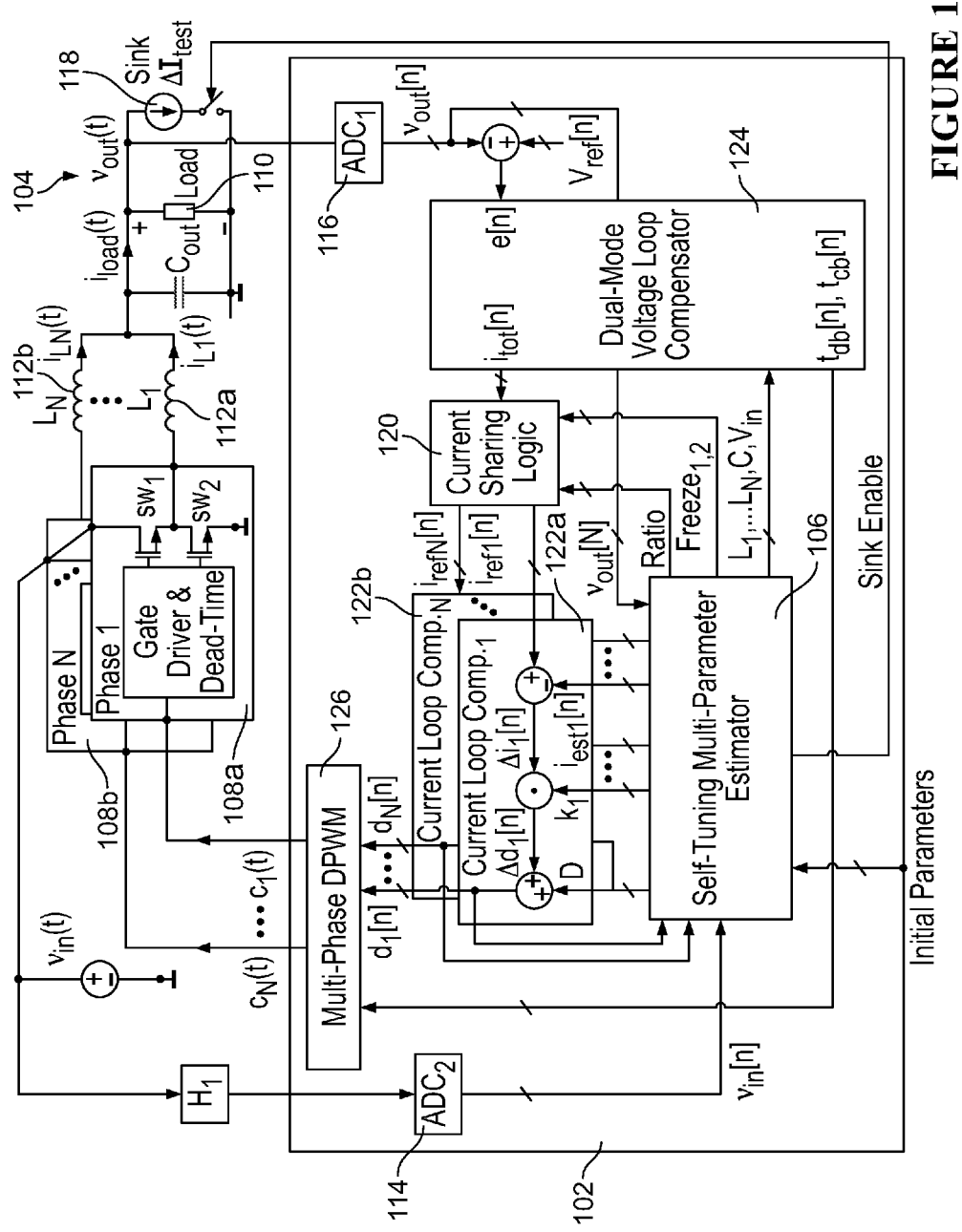
FIG. 1 is a diagram of an exemplary N-phase buck converter regulated by a sensorless self-tuning controller with multi-parameter estimation.

FIG. 1 is a diagram of a multiphase controller 102 for a DC-to-DC power supply 104.

The multiphase controller 102 includes logic 106 to estimate parameters for multiple phases 108a and 108b that provide a combined current for the load 110. The estimated parameters include a current estimate and an effective resistance estimate for each phase 108a and 108b so that a power loss estimate for each phase 108a and 108b can be produced. The logic 106 adjusts the operation of the phases 108a and 108b using the power estimate for each phase 108a and 108b.

The power losses for each of the phases 108a and 108b are equalized (made more equal) using the power loss estimate for each phase 108a and 108b.

The equalization of power losses of the phases 108a and 108b effectively equalizes the temperature of the phases 108a and 108b without using a temperature sensor.

The controller 102 also estimates inductor values for the inductors 112a and 112b of phases and output capacitance. The inductor and capacitance estimates are used to control the response of the phases to load transients.

An input voltage and an output voltage are sampled with analog-to-digital converters 114 and 116 to produce the current estimate.

The input voltage is sampled before the high side and low side switches of each phase. Duty cycle values for the phases are used in the current estimates to compensate for the sampling error of the input voltage before the switches.

A selectable current sink 118 is used to make the parameter estimates for the phases 108a and 108b.

Current sharing logic 120 produces reference current values provided to current loop logic 122a and 122b associated with the multiple phases 108a and 108b.

The reference current values will be different for each phase 108a and 108b because of process variations that occur during fabrication of the components. The different reference current values can be used to equalize the power losses of the phases 108a and 108b.

The current loop logic 122a and 122b for each phase 108a and 108b uses estimated current to produce duty cycle values for each phase 108a and 108b.

Each phase 108a and 108b can be calibrated individually by freezing the other phase or in a multi phase system with more than 2 phases all other phases.

A current offset can be compensated for by making preliminary current estimates at multiple frequencies. In one embodiment, a current estimator 106 uses an internal value indicative of switching in a circuit, such as phase 108a and 108b, to produce a current estimate. For example, a duty cycle value for the phases can be used.

The current estimator producing preliminary current estimates at multiple frequencies. The use of the preliminary current estimates at multiple frequencies can compensate for switching delays in the circuit affecting current estimation.

An input voltage before high side and low side switches of the DC-to-DC converter and an output voltage of the DC-to-DC converter can be used to produce the current estimate.

In one embodiment, the total switching delay is proportional to the frequency and an offset current is calculated to determine the effect of the switching delay at a normal frequency. A preliminary current estimate at twice the normal frequency and a preliminary current estimate at the normal frequency can be used to determine the current offset. For example, the preliminary current estimate for the normal frequency can be subtracted from the preliminary current estimate at twice the normal frequency to get the current offset. An explanation of one exemplary embodiment for the determination of the current offset is shown below using equations 12-20.

The following describes an exemplary non-limiting embodiment.

A practical sensorless average current-programmed mode (CPM) controller for low-power dc-dc converters operating at high switching frequencies is described. The controller accurately estimates inductor currents and identifies main converter parameters. Namely, total conduction losses in each of the phases as well as the inductors and output capacitance values are identified. The estimate of the losses is used to monitor temperature of the components without costly thermal sensors and for current sharing based on thermal stress equalization increasing system reliability. The identified filter values are utilized in a transient mode controller for obtaining response with virtually minimum output voltage deviation.

A self-tuning digital multi-parameter estimator operates on the inductor time-constant matching principle. It estimates the average inductor current over one switching cycle using an adaptive IIR filter and, in the same process, identifies other converter parameters.

The operation of the controller is verified with a single-phase 12 V-to-1.5 V, 15 W and a dual-phase 12 V-to 1.8 V, 80 W, buck converter prototypes operating at 500 KHz switching frequency. The results show that the controller estimates the current and temperature of the components with better than 10% accuracy, effectively equalizes phase temperatures, and provides virtually minimum output voltage deviation during load transients. The implementation also shows that the controller is well suited for on-chip implementation. Its full realization requires less than 16,000 logic gates and two relatively simple analog-to-digital converters that, in a standard 0.18-μm CMOS process, can be implemented on a small silicon area, no larger than 0.6 $mm^2$.

In low-power switch-mode power supplies (SMPS) used in applications such as computers, medical, automotive, and telecommunication equipment, reliable operation and small volume implementation are of key importance. To ensure reliable operation, dedicated controllers usually employ current measurement for overload protection, as well as for desired current sharing between the converter phases in multi-phase dc-dc converter topologies.

Generally, the current measurement methods can be divided into voltage drop measurement and observer, (i.e. estimator) based. In the first category, the voltage drop caused by the current passing through a sense-resistor or a MOSFET is measured. Observer-based systems usually estimate current from the voltage across the power stage inductor. In most cases, existing solutions are not well suited for integration with rapidly emerging digital controllers for low-power high-frequency dc-dc converters. Voltage drop methods either decrease power processing efficiency or require a large gain-bandwidth amplifier, which is costly and challenging to realize in the latest CMOS digital processes. This is mostly due to unacceptably large silicon area requirement and power consumption of such an amplifier. Also, the conventional analog architectures often cannot operate at the limited supply voltages of standard CMOS digital circuits. On the other hand, the observers suffer from a limited accuracy. Current estimation method relies on a prior knowledge of the inductance and equivalent series resistance values, i.e. the inductor time constant, which changes with operating conditions and external influences. To solve for this, a mixed-signal system relying on digital adjustment of a multi-bank analog filter is proposed. The system effectively minimizes influence of the time-constant mismatch at the price of an increased external part count.

In multi-phase converters, regulation of phase currents is also required. Even if all phases are designed equally some of them can take significantly larger currents than others, due to mismatches in actual component values. Consequently, current and thermal stress related system failures occur. To minimize the current mismatch, direct and indirect current equalizing methods are applied. Direct methods usually utilize current sensors in each of the phases to match phase currents using control algorithms. Indirect methods match the duty ratios of control signals for all phases, such that the maximum processing efficiency is achieved. However, from the reliability standpoint, neither of the schemes is optimal. In both cases, a possible significant mismatch in the phase temperatures causes frequent thermal cycles of the power stage resulting in a premature system failure. A current sharing method based on maintaining equal temperature of all phases is proposed before. However, though very useful, the proposed solution has not been widely adopted, mainly due to practical implementation problems. The system requires costly temperature sensors placed next to the heat generating components that, with the exception of high-end systems, are not suitable for the targeted high-volume low-power applications. In addition, the temperature sensors further increase component counts, circuit layout area, and the overall size of the system.

A practical fully digital controller of FIG. 1 that eliminates the need for costly current and temperature sensors and is well suited for a single-chip implementation. It accurately estimates phase currents, provides temperature monitoring, and equalizes thermal stress. In addition, the controller also has a fast dynamic response achieving practically minimal output voltage deviation during transients. The novel self-tuning multiple parameter estimators estimates the average inductor currents over a switching cycle. The total conduction losses of all phases, the inductance values, and the output capacitance. In this case, its fully digital implementation, not only improves the observer accuracy, but also allows estimation of other converter parameters.

The system of FIG. 1 operates as a modification of an average current-programmed mode (CPM) controller. It is comprised of a dual-mode voltage compensator, current sharing logic, and current-compensating loops. In steady-state, the dual-mode compensator 124 samples the error signal e[n] and calculates $i_{tot}[n]$, a digital value proportional to the total current of all phases (i.e. to the load current). The $i_{tot}[n]$, is then passed to Current Sharing Logic 120 that sets current references for all converter phases, $i_{ref1}[n]$ to $i_{refN}[n]$, such that the temperature of all phases is the same, minimizing the thermal stress. Those references are compared to estimates of the inductors currents $i_{est1}[n]$ to $i_{estN}[n]$ obtained with the multi-parameter self-tuning estimator. The resulting current differences $\Delta i_1[n]$ to $\Delta i_N[n]$ are then passed through current compensators 122a and 122b to the multi phase digital pulse-width modulator (DPWM) 126 that, based on the input signals $d_1[n]$ to $d_N[n]$, creates modulating signals for all phases.

In addition, to accurately estimating phase currents, the estimator also extracts information about the total conduction losses, i.e. equivalent resistance, of each phase. The information about the losses is utilized for temperature monitoring and thermal equalization. Furthermore, the controller also extracts the values of power stage inductors and the output capacitor. The dual-mode compensator uses the LC values in its transient suppression algorithm, to achieve a response with virtually minimum output voltage deviation.

As described in the following section, the estimation of all parameters is based on the measurement of the input and output converter voltages and on the inherently available duty ratio value only, while its self-calibration is performed with the help of a known current sink.

FIGS. 2A and 2B explain the principle of operation of the conventional analog current estimator and the self-tuning digital system introduced in this paper, respectively, on a single phase dc-dc converter example. In the analog implementation, which is frequently used in low-power SMPS, the inductor current $i_L(t)$ is extracted by placing an R-C filter in parallel with the power stage inductor and measuring the filter's capacitor voltage $v_{sense}(t)$. The relationship between the voltage and the inductor current is given by the following transfer function:

$$V_{sense}(s) = I_L(s) \cdot R_L \cdot \frac{1 + s \cdot \frac{L}{R_L}}{1 + s \cdot R_f C_f} \quad (1)$$

$$= I_L(s) \cdot R_L \cdot \frac{1 + s \cdot \tau_L}{1 + s \cdot \tau_f},$$

where L and $R_L$ are the inductance and its equivalent series resistance values, respectively, and $R_f$ and $C_f$ are the values of the filter components. When the filter parameters are selected so that $\tau_f = R_f C_f = L/R_L = \tau_L$, the capacitor voltage becomes an undistorted scaled version of the inductor current (the zero and pole cancel each other) allowing the inductor current to be reconstructed from the capacitor voltage measurements.

The main drawback of this method is that the inductor parameters are not exactly known and do change over time, often causing large errors in the estimation. To minimize this effect, an analog filter with programmable resistive network is proposed in, where, in the latter publication, an on-chip implementation of the filter is shown. Even though the method significantly improves the estimator accuracy, its implementation still requires a relatively large number of external/passive components and the sensed current is still an analog signal, making it less suitable for integration with digital controllers.

In the estimator introduced here, the analog filter is replaced with a fully digital equivalent, where the digital filter is tunable, as shown in FIG. 2B. The voltage across the inductor is converted into a digital value $v_L[n]$ and then processed, to result in the output $i_{sense}[n]$ directly proportional to the average inductor current over one switching cycle.

By manipulating and applying bilinear transformation, the following difference equation for the digital filter is derived:

$$i_{sense}[n] = \frac{v_{sense}[n]}{R_L} \quad (2)$$

$$= G \cdot \{c_1 \cdot R_L \cdot i_{sense}[n-1] + c_2 \cdot (v_L[n] + v_L[n-1])\},$$

where $G=1/R_L$ is the estimator gain, $c_1$ and $c_2$ are filter coefficients:

$$c_1 = \left(2 \cdot \frac{L}{R_L T_s} - 1\right) / \left(1 + 2 \cdot \frac{L}{R_L T_s}\right), \quad (3)$$

$$c_2 = \left(1 + 2 \cdot \frac{L}{R_L T_s}\right)^{-1}, \quad (4)$$

and $T_s$ is the sampling rate. The estimator adjusts the filter gain and coefficients $c_1$ and $c_2$ through a self-calibrating process. It is obtained with a help of a test current sink connected to the converter output, as shown in FIGS. 1 and 3. During brief calibration periods, the sink, implemented as a resistor with known value, takes a small portion of the nominal load current. Then, based on the response of the filter, the self-tuning estimator 106 adjusts the filter gain and coefficients, so that the increase in $i_{sense}[n]$ corresponds to the exact increase in the load current. The calibration technique introduced here is similar to the one presented before where a known test current is injected through the inductor during the converter start-up, to adjust an analog filter of a conventional RC current estimator. However, the previously proposed current injection method requires both converter switches to be turned off during the calibration, making the procedure challenging to apply during regular converter operation. As a consequence, the estimation accuracy might be compromised, since the $R_L$ and L vary with operating conditions.

In the method introduced here, the current sink of FIG. 3 does not require any change in converter operation allowing the calibration to be performed regularly, during closed loop converter operation.

Gain and Time Constant Calibration.

The proper values of the filter gain $G=1/R_L$ and its time constant $\tau_f=\tau_f=L/R_L$ of Eq. (1) to (3) are determined from the estimator and the converter output voltage transient waveforms, caused by a single on-off action of the test current sink. The waveforms of FIGS. 4A and 4B, which show converter output voltage, inductor current, and the estimated average current over one switching cycle, demonstrate the gain and time constant adjustment procedure. Initially, the gain value is found and, in the following step, the time constant is determined.

To find the estimator gain, its output value is compared before and after the sink turn-on transient, once the new steady state is reached. Those two points are labeled as A and B in the diagram of FIG. 4A. At point B, which is selected long after the transient relative to the time constants $\tau_L$ and $\tau_f$ of equation (1), i.e. $T_{AB}>5\,\tau_f$ and $T_{AB}>5\,\tau_L$, the output of a well tuned estimator should increase by $R_L \cdot \Delta I_{test}$, where $\Delta I_{test}$ is the known amplitude of the calibrating sink step. For the digital implementation of FIG. 2B this increase should be equal to the digital equivalent of $\Delta I_{test}$. At the point B the actual response of the estimator, $\Delta I_m$, is measured and the proper value of the gain is calculated as:

$$G = \frac{1}{R_L} = \frac{\Delta I_{test}}{\Delta I_m} G_{initial}, \quad (5)$$

where $G_{initial}$ is the initial gain value.

In the system of FIG. 1, point A is selected during the time when error signal e[n] is zero over several cycles (indicating steady state) and point B is chosen when both the compensator and the filter of FIG. 2B reach steady state. At the end of this first phase of the calibration, the current sink is left in the on-state consuming current $\Delta I_{test}$.

Time Constant Calibration.

Equations (1) and (2) indicate that the calibration of the gain G results in an accurate dc current measurement but does not guarantee that the output of the estimator will follow the inductor waveform accurately. The variations in $R_L$ and L values, due to operating conditions, external influences, and production tolerance affect the time constant $\tau_L$ and therefore, result in a distortion of the estimator waveform.

The closed-loop calibration procedure of the time constant $\tau_F$ is based on the observation and, consequent, correction of the undershoot/overshoot in the estimator response to the transient caused by a turn-off of the test current sink. The procedure is demonstrated in FIG. 4B, showing key waveforms of the converter FIG. 1 and the estimator for both an un-tuned and tuned cases. To find the values of the estimator undershoot/overshoot, its output is captured at the output capacitor voltage peak point (on the diagram labeled as D), where the instantaneous inductor and the load current of a closed loop dc-dc converter are the same. At this point, the output of a properly tuned estimator decreases by $\Delta I_{test}$, corresponding to the drop in the output current due to the turn-off of the current sink. On the other hand, an out-of-tune filter, whose time constant differs from the actual inductor time constant $\tau_L = L/R_L$, exhibits undershoot or overshoot. To compensate for this, the estimated value is captured at the peak point D, and its increment is compared to the expected value $\Delta I_{test}$. Accordingly, the time constant of the filter is adjusted as:

$$\tau_f = \tau_{f\_initial}\left(1 + \frac{\Delta I_{peak}}{\Delta I_{test}} \cdot \frac{1}{1 - \frac{\Delta T_{peak}}{2\tau_{f\_initial}}}\right). \quad (6)$$

where $\tau_{f\_initial}$ is the initially set filter time constant and $\Delta T_{peak}$ is the time distance between points C and D, i.e. the initial transient and the peak voltage points. Equation (6) is derived based on the assumption that the sensed current changes in an exponential fashion, with time constant $\tau_{f\_initial}$, and Taylor's expansions of that waveform. In this case, the first three elements of the series are taken into account, i.e. $e \approx 1-x+x/2$, and the sensed and actual current step values equalized at the point $x = \Delta T_{peak}/\tau_{f\_initial}$.

It should be noted that the filter time constant tuning procedure presented here is significantly faster than previous iterative solutions, allowing one-step adjustment and consequent use of the estimator for over-current protection and monitoring in a dynamic environment.

Estimation of Conduction Losses.

Figures 5A, 5B:
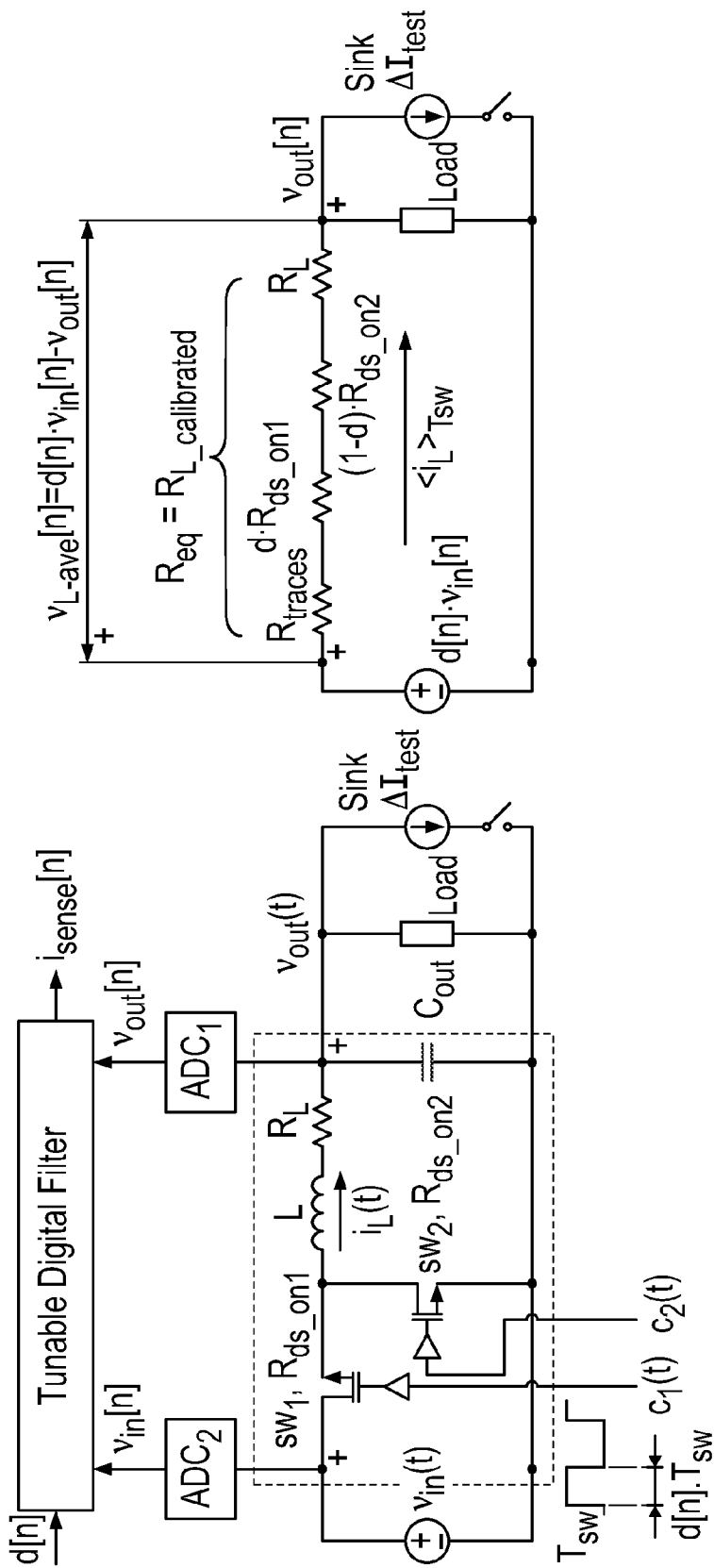
FIGS. 5A and B are diagrams that illustrate a buck converter and a steady state DC-equivalent circuit.

The gain calibration procedure described in the previous subsection inherently provides information about the inductor resistance, i.e. $R_L=1/G$, allowing for the estimation of its conduction losses. To estimate not only the inductor conduction losses but also those of the switching components and PCB traces, the circuit of FIG. 2B is modified as shown in FIG. 5A. In this case, instead of measuring instantaneous voltage drop across the inductor, the average voltage (over one switching cycle) between the input and the output of the converter is measured. The modification effectively changes the series resistance connected to the inductor "seen" by the estimator, such that it also encompasses effects of the other losses. For a buck converter similar to that in FIG. 2A, these losses can be represented with the dc equivalent circuit shown in FIG. 5B, obtained by circuit averaging over one switching cycle. In this figure, d is the converter duty ratio, $R_{traces}$ represents the equivalent resistance of the PCB traces, while and $R_{ds\_on1}$ and $R_{ds\_on2}$ are on-state resistances of the main switch and synchronous rectifier, respectively. Compared to the case described originally, the gain calibration procedure is not changed at all. However, the resulting gain of the estimator becomes:

$$G = \frac{1}{R_L + d[n] \cdot R_{ds1\_on} + (1 - d[n]) \cdot R_{ds2\_on} + R_{traces}} = \frac{1}{R_{eq}}, \quad (7)$$

This value contains information of the total conduction losses, i.e. of the equivalent resistance $R_{eq}$ of the entire converter. In the controller of FIG. 1, this value is used for the temperature monitoring of the converter components without utilization of costly temperature sensors, as described later.

In the following sections, it is also described that this modification not only allows estimation of the conduction losses and consequent thermal stress equalization, but also drastically reduces hardware requirements for the ADCs of FIG. 1, further simplifying controller implementation.

Power Stage Inductor and Capacitor Identification.

In addition to estimating the inductor current and total conduction losses, at the same time the estimator identifies values of the power stage inductor and capacitor. These parameters are utilized to obtain fast dynamic response of the controller approaching physical limitations of the powers stage, as shown below.

The inductor value L is simply calculated from the estimated total losses and the calibrated time constant of the filter as $$L = \tau_f R_{eq}, \tag{8}$$

Figure 4A:
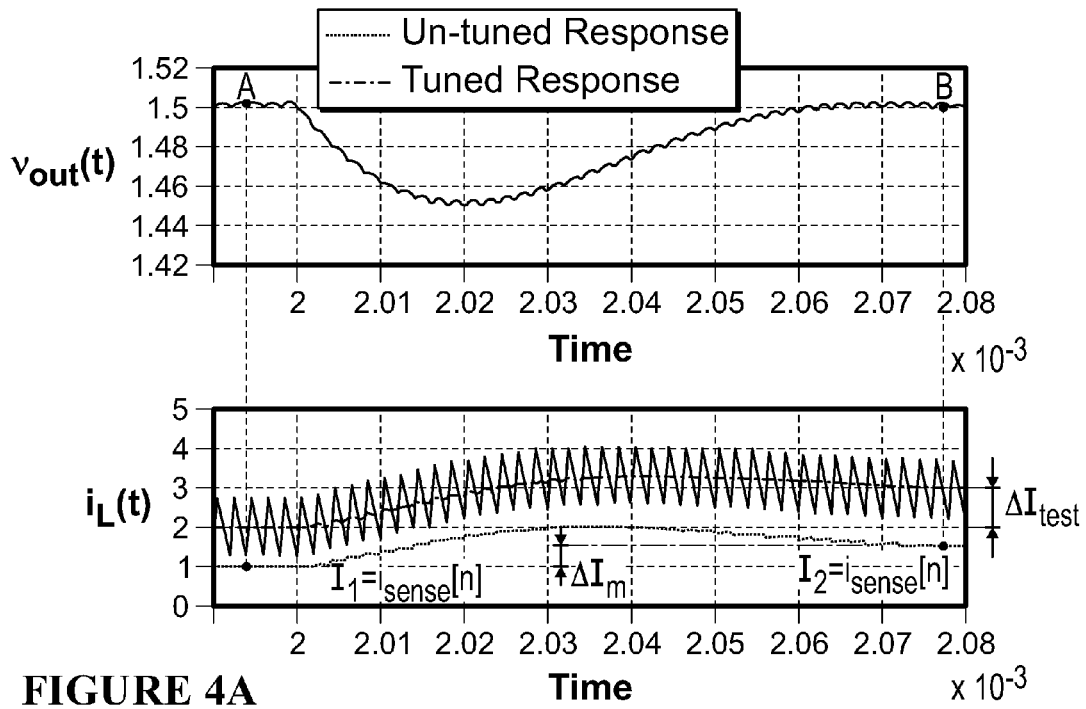
FIGS. 4A and B are graphs that illustrate gain calibration and time constant calibration of a current sensor filter.
Figure 4B:
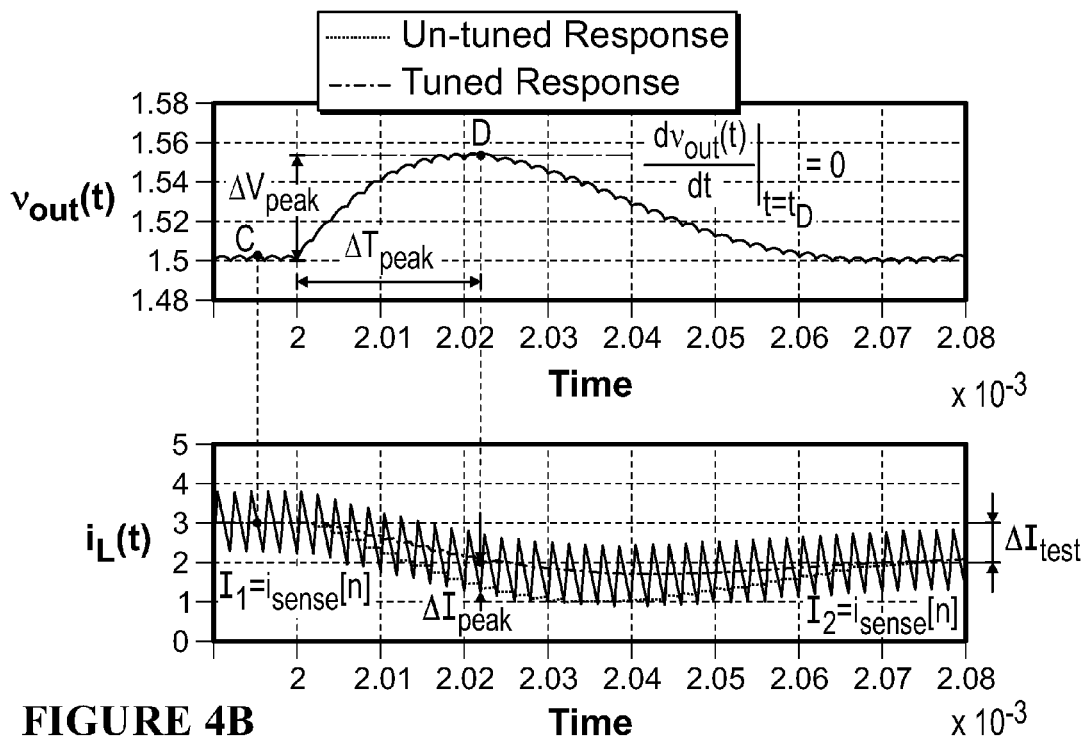
Figure 6:
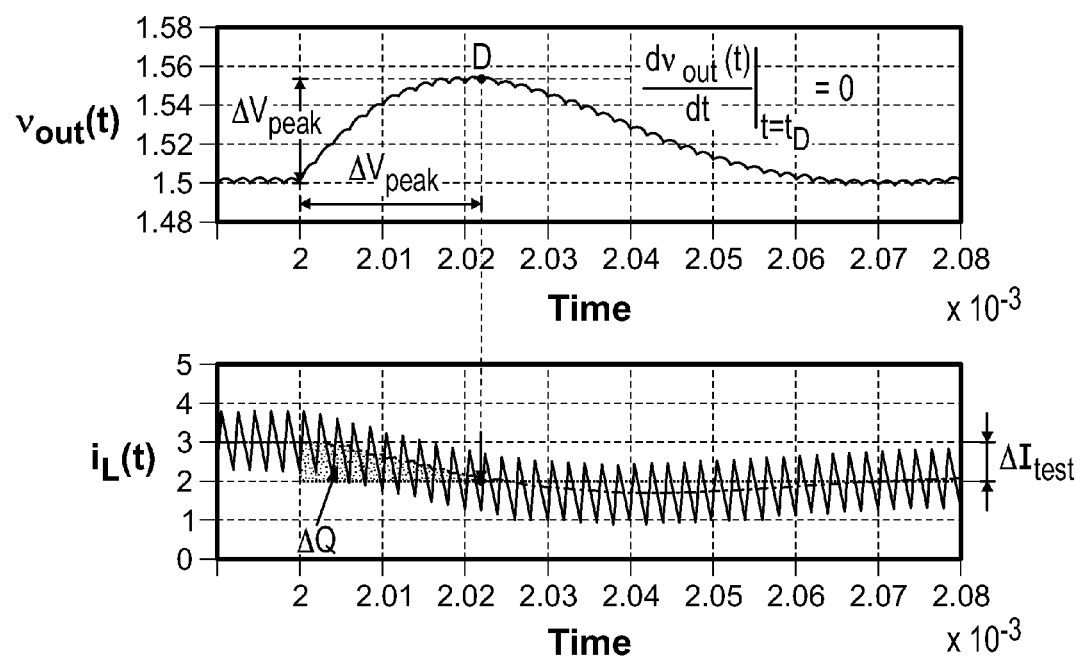
FIG. 6 are graphs that illustrate an output capacitor identification procedure.

During the filter time constant calibration procedure, the output capacitor value is also estimated, from the capacitor charge balance depicted with FIGS. 4A and 6. At the peak point, labeled as D, the controller captures the time instant $\Delta T_{peak}$ and the amplitude deviation of the output capacitor voltage $\Delta V_{peak}$. Based on these two values, the output capacitance is determined by equating the following two expressions:

$$\Delta Q = C \cdot \Delta V_{peak} \tag{9}$$

$$\Delta Q = \tfrac{1}{2} \Delta I_{test} \cdot \Delta T_{peak} \tag{10}$$

where, equation (9) represents the change of the capacitor charge and equation (10) is the area shown in FIG. 6. This area is approximately equal to the excess of charge brought by the inductor current during the current sink turn-off transient. As a result, the following expression for the estimated capacitance is obtained:

$$C = \frac{\Delta I_{test} \cdot \Delta T_{peak}}{2\Delta V_{peak}} \tag{11}$$

It should be noted that, in addition to using the estimate of LC for improving load transient response, the results of identification can also be used to monitor the converter stability margin.

Figure 7:
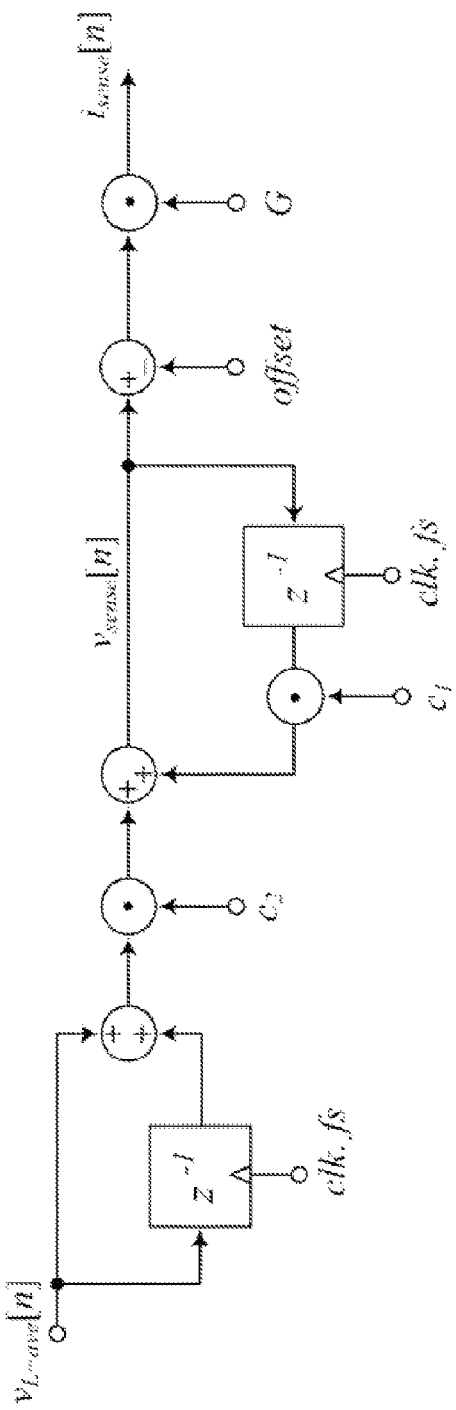
FIG. 7 is a diagram of an exemplary tunable digital IIR filter.

Direct implementation of an estimator based on FIG. 2B, which would reconstruct the instantaneous value of the inductor current, is challenging and, most probably, impractical for targeted cost-sensitive applications. It would require a very fast differential input ADC, theoretically with an infinite sampling rate, as well as an equally fast processor for the filter implementation. Hence, to reduce the hardware requirements, average inductor voltage over one switching cycle $v_{L\_ave}[n]$ is measured. Then, as shown in FIG. 7, this value is passed to an IIR tunable digital filter implementing to obtain the average inductor current value.

Inductor Voltage Measurement.

Figure 8:
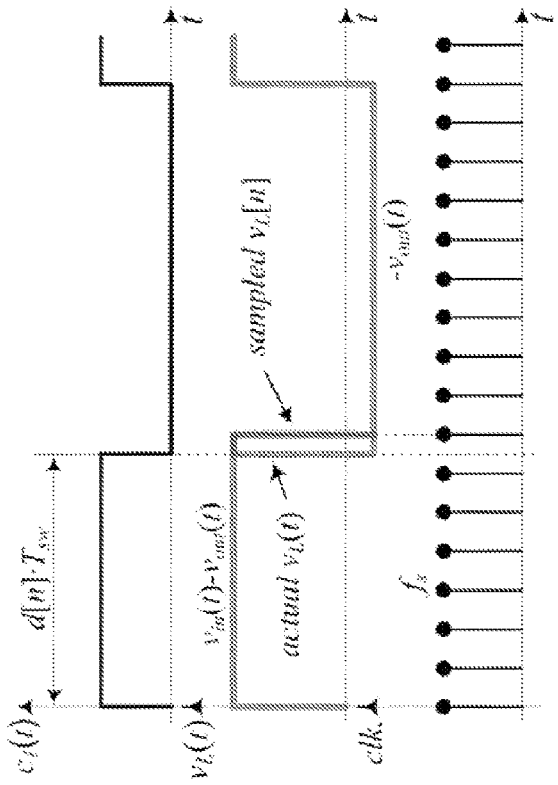
FIG. 8 is a timing diagram illustrating issues that can occur with the use of an over-sampling ADC.

Direct measurement of the average inductor voltage still requires a differential-input ADC with a sampling rate significantly higher than the converter switching frequency. The need for a high sampling rate ADC can be explained by looking at FIG. 8, showing idealized inductor voltage of a buck converter, its gate drive signal $c_1(t)$, and the sampling signal of an oversampling ADC, labeled as clk. Here, it is assumed that the voltage is calculated by averaging the ADC samples over one switching period. It can be seen that, due to a mismatch in synchronization, the state of the inductor voltage during switching transition happening in between two samples is not determined. As a consequence, an error in the average value calculation, proportional to the ratio of the sampling and averaging period, occurs. To minimize the error of this direct measurement approach, a very high-sampling rate differential ADC can be used. However, for low power converters', operating at high switching frequencies, ranging from a fraction of MHz to tens of MHz, such an ADC represents a serious implementation obstacle. On the other hand, extension of the averaging process over several switching periods would slow down estimation process negatively affecting controller dynamic response and would delay reaction of the current protection.

To eliminate the need for a fast differential-input ADC without sacrificing the speed of the estimation, the system of FIG. 2B is modified as shown in FIGS. 1 and 5A. The input voltage of the power stage, $v_{in}(t)$ is converted into a digital equivalent $v_{in}[n]$ with a slow ADC (in FIG. 1 labeled as ADC2), operating at a rate lower than the switching frequency, and the average value of the inductor voltage and current are estimated as:

$$\langle v_{L\_estimate}[n] \rangle_{T_{SW}} = d[n] \cdot v_{in}[n] - v_{out}[n] \text{ and}$$

$$\langle i_{L\_estimate}[n] \rangle_{T_{SW}} = G(d[n] \cdot v_{in}[n] - v_{out}[n]) \tag{12}$$

where d[n] is the DPWM's control variable and $v_{out}[n]$ is the converter output voltage, both of which are readily available in the control loop of FIG. 1. The $v_{out}[n]$ value is provided by the ADC of the voltage control loop and the duty ratio is given by the digital compensator. A lower sampling rate is possible because in most targeted dc-dc converter applications the input voltage changes relatively slowly.

Offset Calibration.

In a realistic converter, the actual average inductor voltage usually differs from equation (12). Mostly due to a discrepancy between the actual, i.e. effective, duty ratio of the signal at the switching node (labeled as $L_x$ in FIG. 2, and that issued by the controller d[n]. The difference is caused by the delays of non-overlapping circuits, unbalanced timing of gate drivers, as well as, by the presence of voltage ringing at the switching node, due to the existence of a resonant circuit formed by parasitic components.

As a consequence, an offset between the estimate and the actual average value of the inductor voltage over one switching cycle $\langle v_{L\_actual} \rangle_{T_{sw}}$ exists. This offset can be expressed as $$\langle v_{L\_offset} \rangle_{T_{SW}} = \frac{\langle i_{L\_offset}[n] \rangle_{T_{SW}}}{G} \tag{13}$$

$$= \langle v_{L\_actual} \rangle_{T_{SW}} - \langle v_{L\_estimate} \rangle_{T_{SW}}$$

where $$\langle v_{L\_actual} \rangle_{T_{SW}} = d_{eff} v_{in}(t) - v_{out}(t) \tag{14}$$

$d_{eff}$ is the effective duty ratio value. This error in output voltage estimation also causes a proportional offset in the current measurement.

To eliminate the offset, a cancelation procedure is developed. The procedure relies on the fact that, in a steady-state, a properly operating feedback always adjusts d[n], so that is constant, $$d_{eff} = d[n] + \frac{\Delta t}{T_{SW}} \tag{15}$$

where $\Delta t$ models previously described delays of a realistic converter and is directly proportional to the offset.

In other words, the controller regulates the converter output such that it keeps the effective duty ratio constant, compensating for all the delays existing in a realistic system. To find the value $\Delta t/T_{sw}$ and compensate for it, i.e. eliminate the offset $$v_{L\_offset} = \frac{\Delta t}{T_{SW}} v_{in}(t) \qquad (16)$$

a dual-frequency operation based offset cancellation procedure utilizing (15) is developed. In the procedure, the switching frequency of the converter is temporarily increased to 2fsw resulting in a new controller duty ratio value, $$d_{hf}[n] = d_{eff} - \frac{2\Delta t}{T_{SW}} \qquad (17)$$

and this value is compared to the controller value at the nominal frequency of equation (15).

By eliminating $d_{eff}$ from equations (15) and (17), the offset is calculated as $$\frac{\Delta t}{T_{SW}} = d[n] - d_{hf}[n], \qquad (18)$$

and $$v_{L\_offset} = (d[n] - d_{hf}[n]) v_{in}[n], \qquad (19)$$

by replacing (19) into (13) we obtain:

$$i_{L\_offset} = i_{L\_2fsw} - i_{L\_fsw}, \qquad (20)$$

where $i_{L\_2fsw}$ and $i_{L\_fsw}$ are results of frequency estimation for the operation at two times the switching and the switching frequency, respectively.

This simple equation is implemented to calculate the offset calibration value for the system of FIG. 6.

Multi-Phase Operation.

Figure 9:
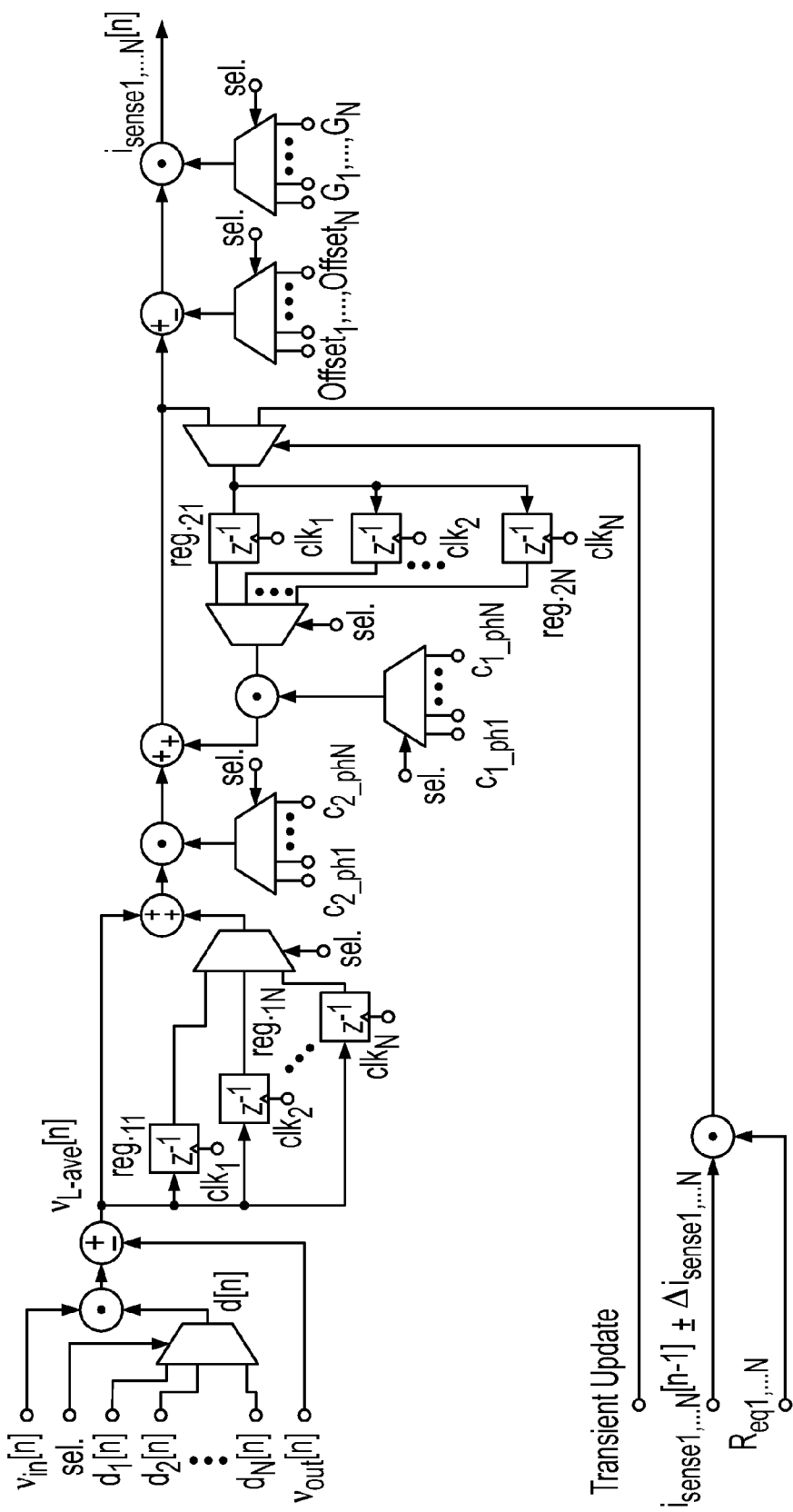
FIG. 9 is a diagram of a tunable IIR estimation filter for an N-phase converter.

To extend the operation of the estimator to multi-phase converters without a significant increase in hardware complexity, the system of FIG. 6 and tuning procedure are slightly modified, such that the same ADCs and current sink are shared between all the phases. Furthermore, in this modification, shown in FIG. 9, the same set of adders and multipliers process individual phase parameters, which are separately determined through a step-by-step calibration procedure described in this subsection. The individual parameters are sent to common elements through a set of multiplexers, as shown in FIG. 9.

Step-by-Step Calibration Procedure.

The inductor parameters, i.e. L and $R_L$, and other resistive losses usually vary from phase to phase, both in the cases when the phases are intentionally sized in a non-uniform manner and when an identical design for all of them is targeted. This implies that the previously described multi-parameter estimation procedure needs to be conducted for each of the phases. Multi-phase operation also requires a modification in the current-sink based self-calibrating procedure described in the previous section.

Due to the differences in the equivalent resistances of individual phases, for an untuned system, the current step is likely to be shared in an unknown manner, even if the phases are designed equally. Hence, no reliable information about the current increase per phase, which is a key parameter for the estimator, can be obtained by directly applying the previously described single-phase procedure.

To solve this problem, a phase-by-phase calibration procedure of the system shown in FIG. 1 is applied. In this procedure, during the current sink action, the currents of all phases but the one under the calibration are "frozen", by allowing only the control signal $i_{ref}[n]$ of the phase under calibration, i.e. phase k, to change while keeping all the others at their pre-calibration values. As a result, only the current in the active phase increases by the value equal to that of the current sink, allowing the estimation process to be conducted as for the single-phase case. The obtained set of parameters for the phase k is then passed to the corresponding inputs and registers of the system shown in FIG. 8, and the procedure is repeated for all the other phases.

Current Sharing Based on Thermal Stress Equalization.

This section demonstrates how the new estimator can be utilized to improve the reliability of multi-phase converters by minimizing thermal stress through current sharing, without the use of dedicated thermal sensors.

In DC-DC multi-phase low-power converters with identically designed converter phases, most frequently, the load current is either shared equally or such that the maximum efficiency of the converter is obtained. In the later case, peak efficiency is obtained by precisely matching the duty ratio control values of all of the phases. In practice, such precise matching is challenging to achieve due to the variations in the time delays of gate drive circuits and other parasitic delays.

Figure 10A:
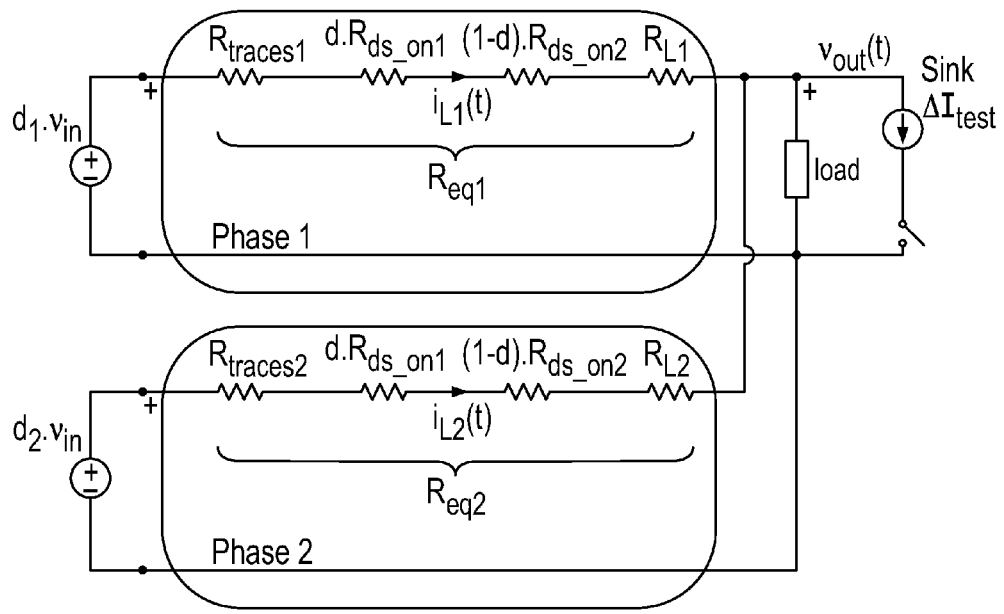
FIG. 10A is a diagram of a dc-equivalent circuit of a two phase converter.
Figure 10B:
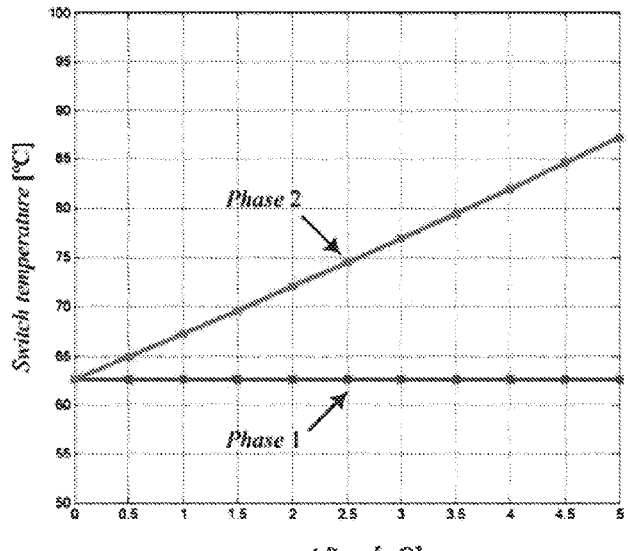
FIG. 10B is a graph of temperature dependence on the mismatch in the equivalent series resistance values of the phases of FIG. 10A.

From the reliability point of view, neither of the two previously mentioned methods is a favorable solution. In both cases, parasitic resistance, mismatches of power switches, and board traces result in significantly higher power losses (temperature) for some phases. This is demonstrated in FIG. 10, showing dependence of the temperature on the mismatch in equivalent phase resistances for a commercial 2-phase 35 A/phase converter. It can be seen that, even when the mismatches are relatively small, the phases with higher losses become significantly warmer than the others.

This temperature difference is a serious reliability problem. It causes shear (mechanical) stress due to the mismatch in the thermal expansions of the warmer and colder parts of the converter circuit. Since converters usually go through frequent thermal cycles, depending on the load variations, this mismatch leads to accelerated aging and premature mechanical failures. As shown in this mechanism is one of the most frequent reasons of failures in modern electronic devices. In the previous art, systems with dedicated thermal sensors measuring the temperature of critical components of each phase are utilized, to minimize thermal stress. The sensors provide information about the temperature of each phase to a modified current loop, whose task is to equalize the phase temperatures. Even though, the presented systems significantly reduce the thermal stress, they have only found application in very specialized low-volume highly reliable systems. The presented thermal sensor based implementation has not been widely accepted in the targeted cost-sensitive low-power applications, due to the increased component count, size, and circuit complexity.

To eliminate the need for the external temperature sensors, the controller presented here utilizes results of the previously described equivalent resistance estimation. It equalizes the thermal stress of the phases by balancing the sources of the temperature mismatch, i.e. phase conduction losses. This is performed with the current sharing logic block of FIG. 1, which sets the reference for the current loop, such that the following sharing is obtained $$R_{eq1} \cdot I_{L1}^2 = R_{eq2} \cdot I_{L2}^2 = \ldots = R_{eqN} \cdot I_{LN}^2 \qquad (21)$$

and, consequently, the temperature mismatch is eliminated. It should be noted that, since the inherent property of the method introduced here is that it controls the sources of the temperature mismatch instead of temperature, it is able to reduce several other problems of the temperature sensor based solutions. Namely, the new controller eliminates potential stability problems related to latency in temperature measurements. The latency caused by relatively large temperature time constants of the measured devices, compared to the changes of conditions in the converter circuit, can cause a significant delay or even incorrect action of a temperature-matching controller during frequent load changes. Since the introduced system has virtually immediate information about the current and can perform parameter estimation at a much faster rate, it minimizes the latency problem. The presented solution is also able to minimize problems with rapid overheating of components that, in methods based on surface temperature measuring, is detected only after the internal parts are already overheated or damaged. Furthermore, this implementation eliminates problems of faulty temperature sensor readings impacted by the surrounding components, PCB layout, and airflow.

Transient Mode Controller.

The transient mode compensator introduced here, which is a part of the dual-mode voltage compensator of FIG. 1, utilizes estimated LC output filter parameters to achieve a fast transient response. It combines dead-beat algorithm with the capacitor-charge balance principle to achieve response with virtually minimum output voltage deviation and recovery in two switching cycles.

Figure 11:
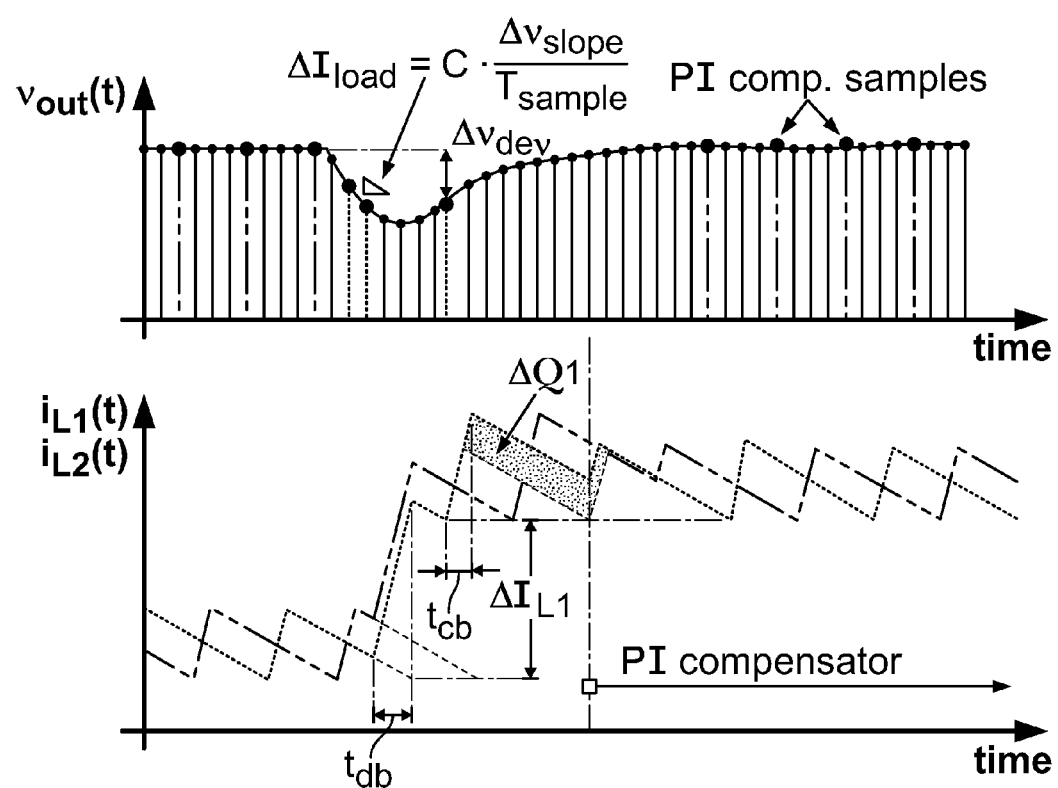
FIG. 11 are graphs that illustrate transient mode operation of one embodiment.

After detecting a significant load current change $\Delta I_{load}$, the transient compensator overrides the operation of a conventional PI compensator and recovers to new steady state in two switching cycles, as shown in FIG. 11.

In the first switching cycle it matches the sum of the inductor currents with the new load value and, in the following cycle, it replaces the lost capacitor charge, recovering the output voltage.

Like systems shown, the load change is calculated by observing the time derivative, i.e. difference, of the output capacitor voltage between two samples e[n−1] and e[n]:

$$\Delta I_{load} = C \cdot \frac{\Delta v_{slope}}{\Delta t} \quad (22)$$
$$= C \cdot \frac{e[n] - e[n-1]}{T_{sample}}$$

where $\Delta v_{slope}$ is the slope of the output voltage, $T_{sample}$ is the sampling period and C is the output capacitance. This value is used to calculate the on and off times of the main switches resulting in the sum of all phase inductor currents to be the same as the new load current. The calculation is performed using a digital dead-beat algorithm, providing dead-bit control time $t_{db}$. For the multi-phase buck converter, the dead-beat times for light-to-heavy and the opposite transient are given with the following expressions $$t_{db\_1} = \frac{L_{eq}}{v_{in} - v_{out}} \cdot \Delta I_{load} \quad (23)$$

$$t_{db\_2} = \frac{L_{eq}}{v_{out}} \cdot \Delta I_{load} \quad (24)$$

where $L_{eq}=L1\|L2\| \ldots \|LN$ is the equivalent inductance of all converter phases connected in parallel. At this point, the average load and inductor currents are matched, but the output voltage is still not at the reference. To compensate for this, at the end of the first switching cycle, the voltage deviation $\Delta v_{dev}$ is captured and the lost charge ($\Delta Q_1$ for phase 1 etc.) is calculated from the charge balance principle, based on the known capacitance and the sampled voltage deviation. This is then used to calculate the on-time ($t_{cb\_1}$) or off-time ($t_{cb\_2}$) for the second, voltage recovery, cycle. It should be noted that this sampling point is determined only by the end of the first switching cycle and generally does not coincide with the peak/valley point of the output capacitor voltage. This eliminates the need to accurately detect the point where the capacitor current changes sign, i.e. the peak or valley point, which is a hardware demanding process requiring a high sampling rate ADC or a fast detection circuit.

Experimental Systems and Results.

The operation of the new controller is verified with a dual-phase 12 V-to-1.8 V, 80-W, buck converter operating at a switching frequency of 500 KHz. The results show that the controller effectively equalizes temperatures of both phases without utilization of off-chip temperature sensors, provides a one-switching cycle response time to load transients, and measures the current with accuracy better than 10%. The implementation also shows that the controller architecture is well suited for on-chip implementation. Its full implementation requires 15K logic gates and two relatively simple analog-to-digital converters that, in a standard 0.18-μm CMOS process, can be implemented on a silicon area no larger than 0.5 mm².

Based on the diagrams of FIGS. 1, 5A, and 7, two experimental systems are designed to verify the operation and various features of the novel sensorless controller and multi-parameter estimator. First, the functionality, accuracy and the dynamic performance of the estimator are tested with a single phase 15-W, 1.5-V, 500 kHz buck converter prototype, with input voltage ranging between 2 V and 6.5 V. This prototype is also used to demonstrate sensorless current and temperature protection features. Then, the current sharing based on the thermal stress equalization and load transient performances are demonstrated on a 2-phase, 12-V-to-1.8-V, 80-W, buck prototype, also operating at a switching frequency of $f_{sw}$=500 kHz. The dual-phase controller is designed using an FPGA based development board and two ADCs for input and output voltage measurements, with respective quantization steps of 4 mV and 16 mV. The input voltage is sampled at $f_{sw}/8$ and the output at a modest rate of $8f_{sw}$, which is significantly lower than the rate of time-optimal solutions are presented. The number of gates needed for the implementation of each functional block is given in Table I. The table also shows an estimate of the equivalent silicon area needed for the implementation of each of the blocks in a standard 0.18-μm CMOS process, commonly used in the targeted applications. The size estimate is obtained by exporting the complete design into an automated IC design tool and measuring the dimensions of the created components.

TABLE I

Gate counts of the multi-phase controller blocks and silicon area estimates.

| Design Block | Area [mm2] | Number of gates |
| --- | --- | --- |
| PI compensator | 0.051 | 1767 |
| Current sharing logic | 0.017 | 632 |
| Two-phase current estimator | 0.080 | 2716 |
| Current compensators | 0.022 | 830 |
| Transient compensator | 0.075 | 2643 |

TABLE I-continued

Gate counts of the multi-phase controller blocks and silicon area estimates.

| Design Block | Area [mm2] | Number of gates |
|---|---|---|
| Current estimator tuning logic | 0.172 | 6168 |
| Two-phase DPWM (8-bits resolution) | 0.021 | 854 |
| Total (digital blocks) | 0.438 | 15610 |

It can be seen that the complete digital logic takes less than 16,000 gates and can be implemented on a smaller than 0.45 mm$^2$ silicon area. Taking into account that application specific ADCs can be implemented on a less than 0.1 mm$^2$, it can be estimated that the entire controller could be implemented on a less than 0.6 mm$^2$ of silicon. This area is no larger than that needed for the implementation of standard analog controllers without any additional features. The result confirms that the controller and estimator architectures introduced here are hardware efficient and, as such, suitable for on-chip implementation in the targeted cost-sensitive applications.

Functional Verification.

FIG. 11 and its zoomed parts, FIGS. 12 to 14 and 16, demonstrate closed loop operation of the single-phase system during self-tuning process and its effect on the measurement accuracy. The calibration is performed with the help of a current sink that introduces a 1-A current step equivalent to a 10% of the maximum load.

Figure 12:
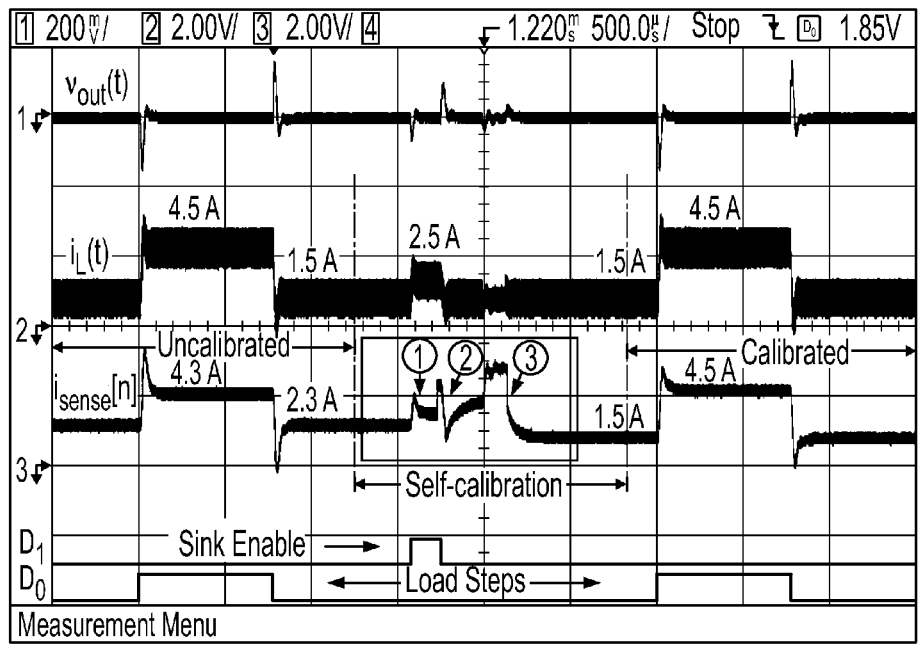
FIG. 12 is a timing diagram that illustrates closed loop self-tuning of the controller.

FIG. 12 illustrates closed loop self-tuning of the controller. Channel 1 shows output converter voltage (200 mV/div). Channel 2 shows actual inductor current $i_L(t)$–2 A/V. Channel 3 shows estimated average current $i_L[n]$–2 A/V. D0-D1 are load step and sink enable signals. The time scale is 500 μs/div.

In FIG. 12 response of the controller and estimator to a 3 A load change, prior and after the self-calibration, is demonstrated. The response is divided into three distinctive regions, labeled as uncalibrated, self-calibration, and calibrated operation. The waveforms show actual inductor current and its estimation that, for visualization purpose, is presented by passing the digital signal $i_{ref}[n]$ (FIG. 1) through a fast digital-to-analog converter (DAC). It can be seen that the uncalibrated system produces inaccurate average current estimate, erroneously measures the size of the load step, and produces transient waveforms that are significantly different from the actual ones.

Figure 15:
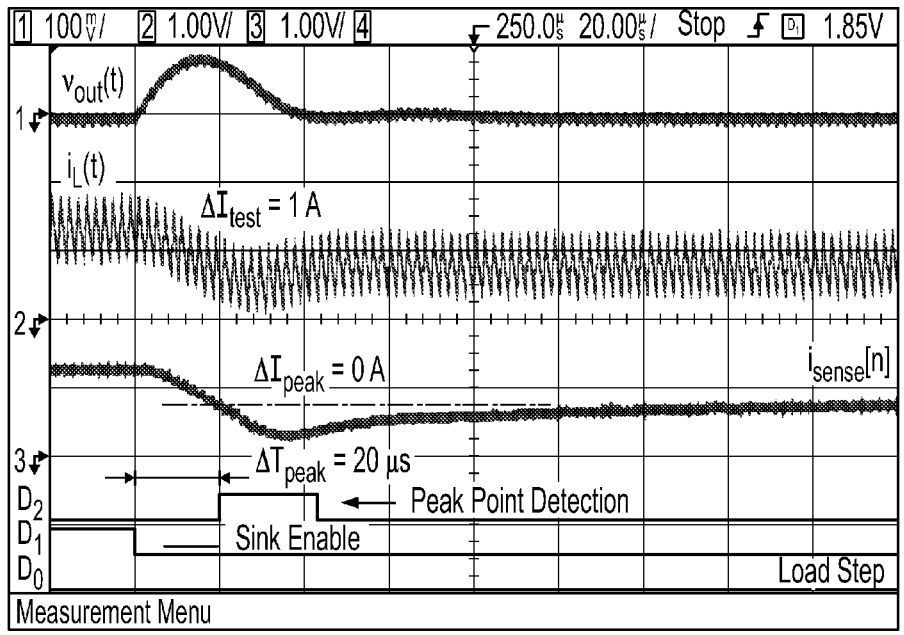
FIG. 15 is a timing diagram that illustrates operation with calibrated gain and time constant.

The self-calibration consists of three steps, gain and time-constant adjustments, followed by the offset calibration. In FIG. 15, the steps are labeled with numbers 1 to 3, respectively.

Gain Calibration.

Figure 13:
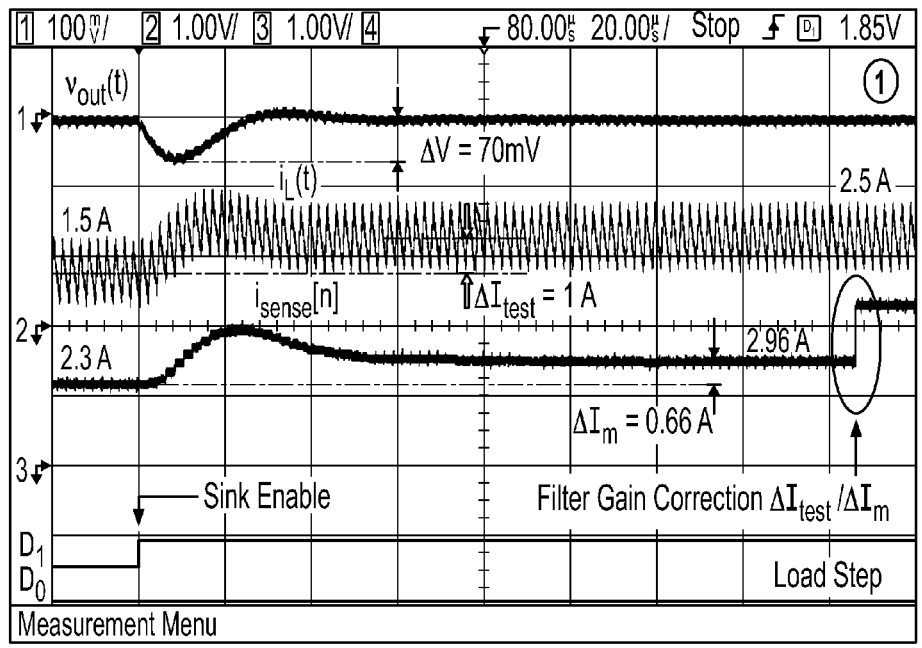
FIG. 13 is a timing diagram that illustrates a gain calibration process.

The gain calibration, which also gives an estimate of the conduction losses, is shown in FIGS. 12 and 13 (zoomed view).

FIG. 13 illustrates the Gain calibration process. Channel 1 is output converter voltage (100 mV/div). Channel 2 is actual inductor current $i_L(t)$–2 A/V. Channel 3 is estimated average current $i_L[n]$–2 A/V. D0-D1 are load step and sink enable signals. The time scale is 20 μs/div.

It can be seen that, after applying a 1-A calibrating current step by the sink, error in the initial gain estimation is detected, through a faulty representation of the increment (0.66 A instead of 1 A) and, consequently, corrected, in accordance with the previously described procedure.

Time Constant $\tau_f$ Calibration.

Figure 14:
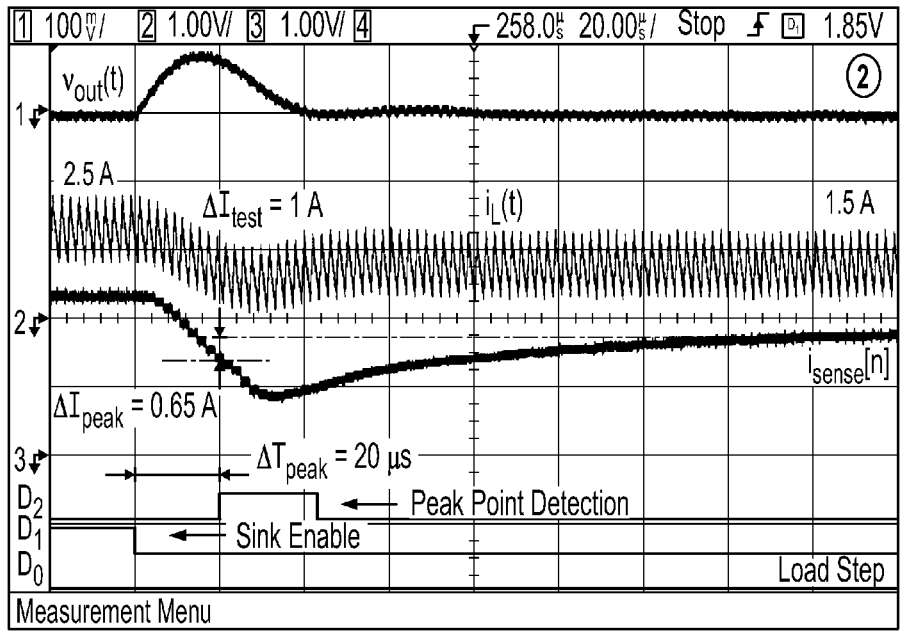
FIG. 14 is a timing diagram that illustrates a filter time constant calibration procedure.

FIG. 14 illustrates the filter time constant calibration procedure for $\tau_f=0.5\tau_L$. Channel 1 is output converter voltage (100 mV/div). Channel 2 is actual inductor current iL(t)–2 A/V. Channel 3 is estimated average current iL[n]–2 A/V. D0-D1 are load step and sink enable signals. The time scale is 20 μs/div.

A zoomed-in view of time constant, $\tau_f$, calibration and a simultaneous L estimation process, performed during transient following turn-off of the current sink, is shown in FIG. 14. By comparing the current estimate with the actual current drop at the output voltage peak, $\tau_f$ is also calibrated. During the same process, the output capacitor value is estimated from the output voltage deviation. In this case, to test the tuning performance, the initial value of the time constant is set to be a half of the actual one, i.e. $\tau_f=0.5\tau_L$. It can be seen that, at the peak point, the output current is not equal to the expect 1 A value and that the estimate shows a larger undershot.

FIG. 15 illustrates operation with calibrated gain and time constant. Channel 1 is output converter voltage (100 mV/div). Channel 2 is actual inductor current $i_L(t)$–2 A/V. Channel 3 is estimated average current $i_L[n]$–2 A/V. D0-D1 are load step and sink enable signals. The time scale is 20 μs/div.

FIG. 15 shows results of an additional test (not a part of the tuning procedure shown in FIG. 12) used to verify a proper time constant tuning. It demonstrates response of the same estimator after the calibration procedure is completed and another 1-A step-down change of the output current is performed. The estimated current waveforms accurately following the shape of the inductor current confirm that the time-constant calibration procedure is effective.

Offset Calibration.

Figure 16:
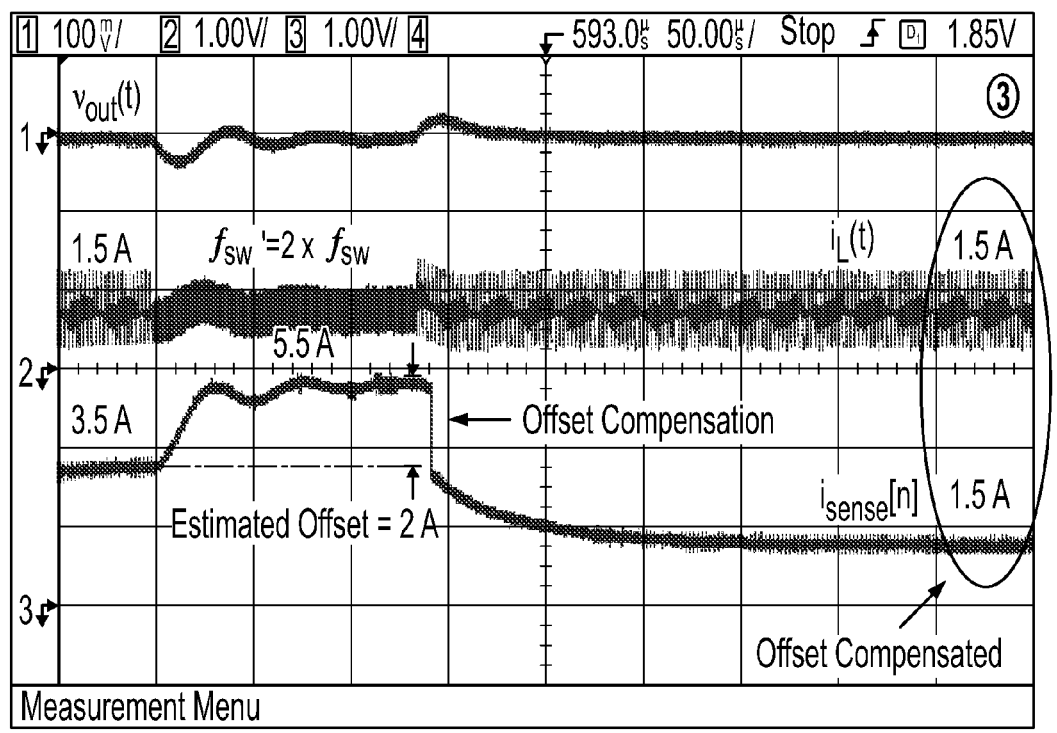
FIG. 16 is a timing diagram illustrates an offset calibration procedure.

FIG. 16 illustrates the offset calibration procedure. Channel 1 is output converter voltage (100 mV/div). Channel 2 is actual inductor current $i_L(t)$ 2 A/V. Channel 3 is estimated average current $i_L[n]$ 2 A/V. The time scale is 50 μs/div.

FIG. 16 shows zoomed in view of the offset calibration procedure. Even though the filter gain and time constant are adjusted in the previous two correction steps, the estimator still exhibits a large offset (showing 3.5 A instead of 1.5 A) prior the offset calibration. As described above, this offset, caused by the discrepancy between the actual and controller-issued duty ratio, is cancelled through the proposed 2-frequency based calibration. In the first step, the switching frequency is increased two times and the resulting change in the estimation (i.e. offset value) is measured. It can be seen that, the offset is increased by an additional 2 A. Based on this offset is calculated and automatically cancelled by the controller.

Estimation Speed and Accuracy.

Figure 17:
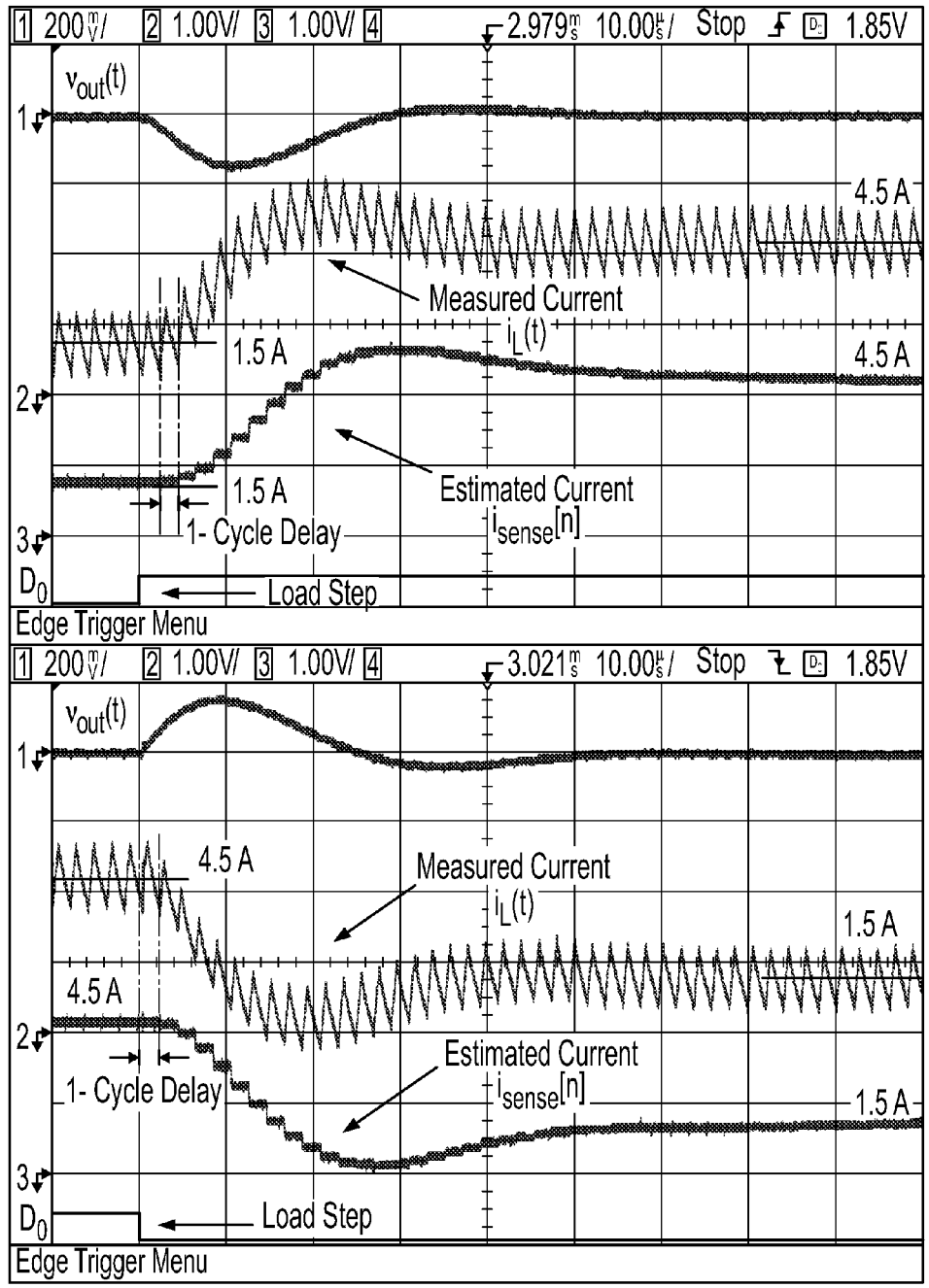
FIG. 17 is a timing diagram that illustrates the inductor current and its estimate in one example.

FIG. 17 illustrates the inductor current end its estimate during 3 A light-to-heavy and heavy-to-light load transients. Channel 1 is output converter voltage (200 mV/div). Channel 2 is actual inductor current $i_L(t)$–2 A/V. Channel 3 is estimated average current $i_L[n]$–2 A/V. The time scale is 10 μs/div.

FIG. 17 shows operation of the tuned system during load transients. It can be seen that the estimate of the average inductor current closely follows the actual value. The results also show that the delay of the estimator is only one switching cycle allowing the system to be used for overload protection and for obtaining fast dynamic response of the controller as demonstrated later.

FIG. 18 illustrates the overload protection. Channel 1 is output converter voltage (1V/div). Channel 2 is actual inductor current $i_L(t)$, scale 2 A/V. Channel 3 is estimated average current $i_{sense}[n]$, scale 2 A/V.

Experimental results demonstrating how the estimator can be used for the overload protection are shown in FIG. 18. The overload protection is set to shut down converter when the estimate exceeds a threshold value, which in this case is set to 7 A. To test the protection, a sudden load change from 2 A to 7.5 A is applied. It can be seen that the protection quickly interrupts operation of the converter preventing potential damages.

Accuracy of Current Estimation.

The worst-case analysis of the system accuracy shows that the measurement error is a function of the ADCs resolution, size of the output capacitor, and the current step introduced by the test sink. It predicts that, for the selected experimental system parameters, about a 5% error in the estimation can be expected.

These results are confirmed by FIG. 19, showing the relative measurement error, over the full range of operation of the single-phase system. It can be seen that, over the 10% to 100% load range, the relative error is less than a 6% and that absolute error never exceeds 0.5 A.

Temperature Monitoring and Protection.

As mentioned before, the multi-parameter estimator can also be used for remote sensorless temperature monitoring and protection. To obtain approximate information about the components temperature, the equivalent resistance of the single-phase power stage is estimated, as described. The results are then compared with a look-up table stored data containing relations between the equivalent resistance and temperature of the components, provided by components manufacturers. The accuracy of the estimation is tested such that the power stage is intentionally heated and the estimated temperature of the components is compared with actual measurements.

FIG. 19B shows the estimation error over a 50° C. temperature change. The results confirm that fairly accurate temperature estimation with an error less than 10% over the full range is obtained. This feature is utilized for temperature protection of the power stage, as demonstrated in FIG. 20.

Figure 20:
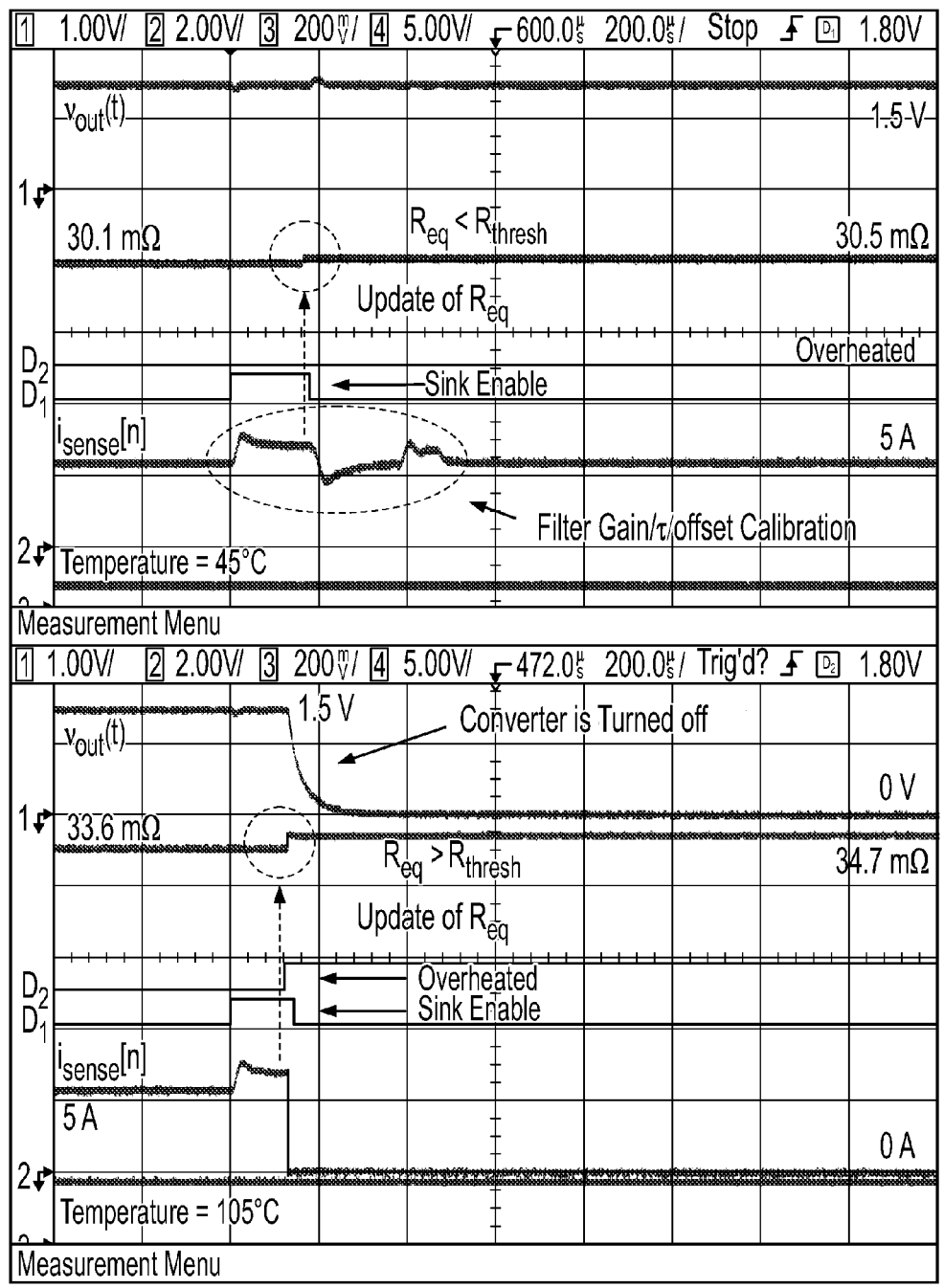
FIG. 20 is a timing diagram that illustrates the operation of thermal protection.

FIG. 20 illustrates operation of the thermal protection. Channel 1 is output converter voltage (1V/div). Channel 2 is estimated steady-state current isense[n]–2 A/V. Channel 3 is estimated Req–1 mOhm/32.5 mV. Channel 4 is MOSFET temperature–25° C./V. D1-D2 are sink enable and overheating flag signal. The time scale is 200 μs/div.

A threshold for the equivalent resistance corresponding to the maximum allowable temperature is set (34 mΩ corresponding to 100° C. for the tested converter) and the temperature of the power stage is increased from 45° C. to 105° C. During the monitoring, the test current sink is activated periodically and based on the subsequently estimated resistance the temperature is determined. It can be seen that the remote temperature monitoring recognizes overheating conditions and attempts to protect components by turning off the power stage and sending a flag signal.

Multi-Phase Operation and Thermal Stress Equalization.

Figure 21:
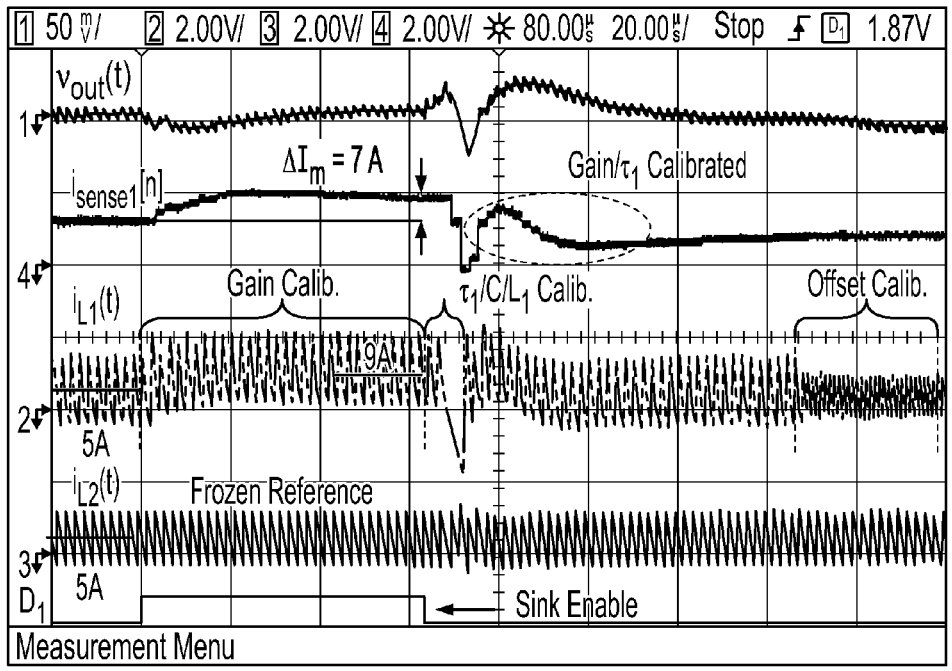
FIG. 21 is a diagram of current estimator tuning and component identification with a multiphase converter.
Figure 22:
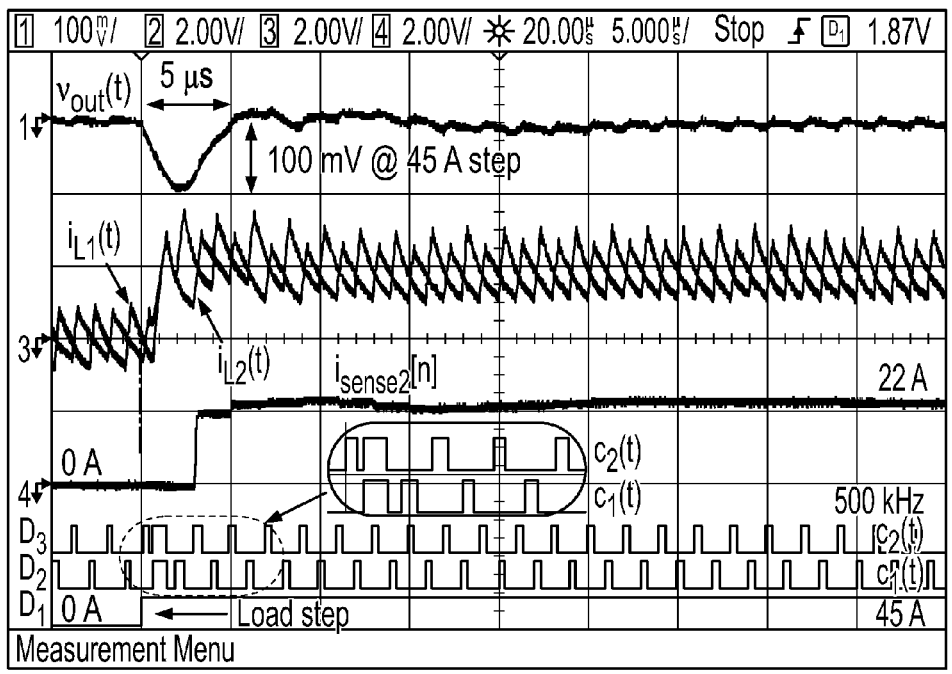
FIG. 22 is a timing diagram that illustrates the transient response of the non-linear average current-mode controller.
Figure 23B:
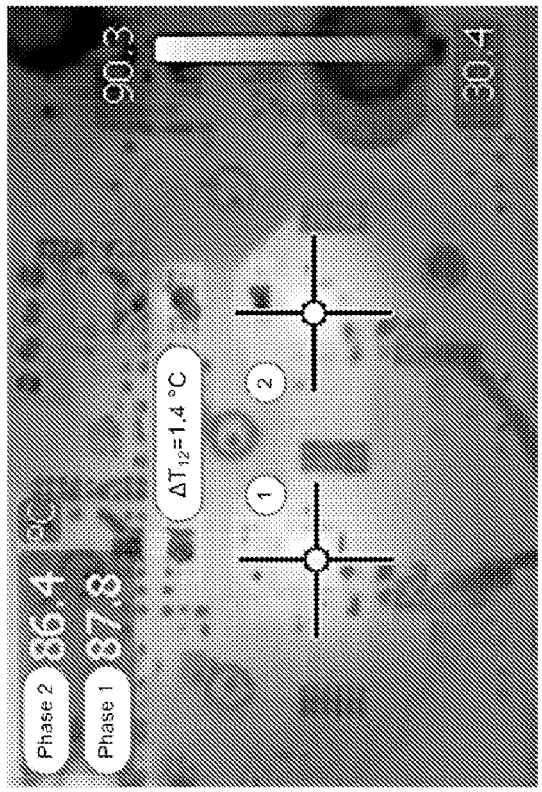
FIGS. 23A and 23B are diagrams that illustrate the temperature differential between phases in different operating modes.
Figure 23A:
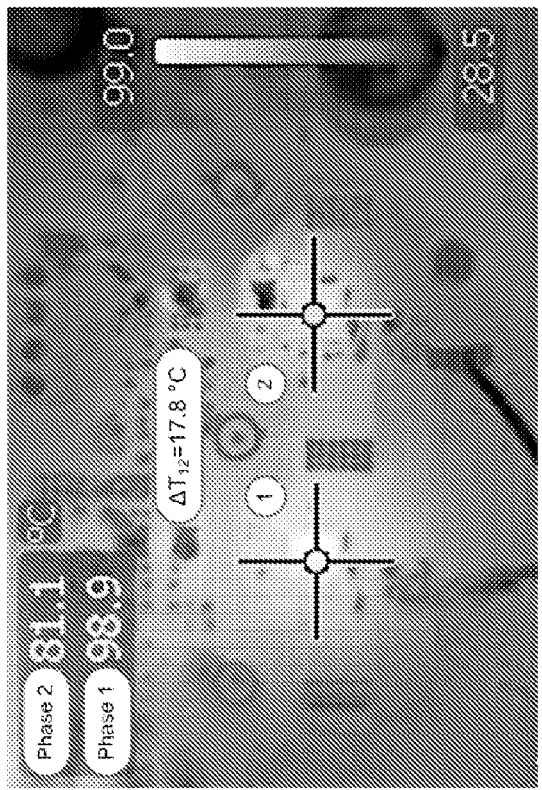

FIGS. 21 to 23 verify operation of the estimator with the two-phase buck converter prototype described at the beginning of this section. FIG. 21 shows step-by-step calibration process where, during the self-tuning, the current of the phase that is not under calibration is kept constant and the parameter estimation is performed for the active phase only. In this case, a 4-A current sink is used for calibration.

FIG. 21 illustrates current estimator tuning and component identification with the multi-phase converter. Channel 1 is output converter voltage (50 mV/div). Channel 2 is actual phase 1 inductor current iL1($t$)–10 A/V. Channel 3 is actual phase 2 inductor current iL2($t$)–10 A/V. Channel 4 is estimated current isense1[$n$]–10 A/V. D1 is a sink enable signal. The time scale is 20 μs/div.

During the calibration, output capacitance and the inductances of both phases are determined too, and used for obtaining minimum deviation response. Experimental results demonstrating dynamic response of the system for a zero-to-full load change are shown in FIG. 22. Results confirm that the proposed controller achieves small output voltage deviation and recovery to the new steady state in two switching cycles.

FIG. 22 illustrates transient response of the nonlinear average current-mode controller. Channel 1 is output converter voltage (50 mV/div). Channel 2 is inductor current iL1($t$)–10 A/V. Channel 3 is inductor current iL2($t$)–10 A/V. Channel 4 is estimated phase 2 current isense2[$n$]–10 A/V. D1-D3 are sink enable and control signals. The time scale is 5 μs/div.

Thermal Stress Equalization.

FIG. 23 shows thermal images of the converter prototype when the full load current is shared based on commonly used equal duty ratio, i.e. maximum efficiency, approach and when the sharing is based on the thermal stress equalization. A comparison of the results verifies that the multi-phase parameter estimator and related control method significantly reduce thermal stress (for the experimental system by more than 16° C.) minimizing influence of one of the most common failure mechanism.

Benefits.

A sensorless self-tuning digital averaged current programmed mode (CPM) controller for low-power high frequency SMPS is introduced. The key novel element of the controller is a self-tuning multi-parameter estimator that, besides accurately measuring the average value of the inductor current over one switching cycle, also estimates converter parameters such as filter components and equivalent conduction losses.

The estimation is based on the well-known RC-filter based principle by replacing the analog filter with a self-tuning fully digital equivalent. In the self-calibration process, a current sink is used. Duty ratio information, inherent in the feedback loop, is used to minimize the requirements for a costly high sampling rate ADC needed for the acquisition of fast changing inductor voltage waveform. DC offset in estimation caused by errors and system delays is cancelled using a novel dual frequency algorithm.

The estimated equivalent series resistance is used for remote temperature measurements and protection without costly thermal sensors. The controller also combines results of current and the resistance estimation to automatically provide current sharing based on the equal thermal stress minimizing the influence of a frequent failure mechanisms. The newly proposed implementation of equal thermal sharing not only eliminates the need for the dedicated thermal sensors but also eradicates large delays associated with temperature measurements causing potential stability problems. Furthermore, since the sharing is based on the calculation of the power losses (i.e. sources of the temperature rise), the implementation also minimizes the influence of external factors such as airflow and the presence of other heat sources.

The LC estimation results are used in a fast transient mode controller for obtaining virtually minimum possible output voltage deviation during load transients and recovery to steady state in two switching cycles. Compared to time-optimal methods, the presented two-cycle procedure reduces sampling requirements for the output voltage ADC further reducing hardware requirements.

The operation of the controller and the multi-parameter estimator are verified with single-phase and dual-phase converter prototypes, demonstrating accurate current estimation, fast dynamic response and effective minimization of the thermal stress. The FPGA implementation of the controller shows that it takes a small number of logic gates and, as such, is well-suited for on-chip implementation with prospective silicon area no larger than that occupied but the existing analog solutions implementing only the basic feedback loop.

Novel features include a time-shared digital multi-parameter estimator; a sensorless method and system for the estimation of the converter equivalent series resistance; a sensorless method and system for the estimation of converter LC parameters; a sensorless implementation of current sharing based on thermal stress equalization; the use of two-frequency method for eliminating offset in the current estimation procedure; and measurement of the average current based on input voltage, output voltage and duty ratio data.

Multiple external current sensors required for monitoring of phase currents are eliminated and replaced with a single current sink circuitry used for online parameter identification. Multiple temperature sensors required for temperature monitoring of phase components are eliminated. Controller current-sense and temperature-sense analog-to-digital converters are eliminated and replaced with a single time-shared multi-parameter digital estimator. Reduced component count, pin count of the controller chip and printed circuit board layout of the switch-mode power supply allows for significant cost and size reduction of the switch-mode power supply. Low hardware complexity of the controller circuit allows for a small chip die when implemented on IC and lower fabrication costs.

The controller offers online estimation of the key power supply parameters such as converter phase inductances, equivalent phase resistance, and output capacitance allowing for online power supply health monitoring and protection. The multi-parameter estimator provides digital information about the average values of phase currents that can be simply interfaced and used with a digital current sharing compensation circuitry. The controller provides dynamic thermal stress equalization between phase components to eliminate premature aging and failures due to overheating. The controller provides a fast transient performance of the switch-mode power supply limited only by the size of the output filter components. The response is virtually insensitive to the component variations due to online tuning performed by the multi-parameter estimator. The controller provides dynamic calibration of the current estimation that significantly reduces the influences of temperature and component parameter variations on the accuracy of current information. The controller allows a simple implementation of the overload current protection and temperature protection. The controller parameters are digitally programmable and dynamically tuned allowing its operation to be insensitive to component parameter variations and tolerances. Therefore, the controller can be used in variety of switch-mode power supply applications.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A multiphase controller for a DC-to-DC power supply comprising:
    logic to estimate parameters for multiple phases that provide a combined output at a load, the estimated parameters including a current estimate and an effective resistance estimate for each phase so that a power loss estimate for each phase can be produced, wherein the logic adjusts the operation of the phases using the power loss estimate for each phase, wherein an input voltage and an output voltage are sampled to produce the current estimate.

2. The multiphase controller of claim 1, wherein the power losses for each of the phases are made more equal using the power estimate for each phase.

3. The multiphase controller of claim 2, wherein the equalization of power losses of the phases effectively equalizes the temperature of the phases without using a temperature sensor.

4. The multiphase controller of claim 1, wherein the input voltage is sampled before high side and low side switches of each phase and duty cycle values for the phases are used in the current estimates.

5. The multiphase controller of claim 4, wherein a current offset is compensated for by making preliminary current estimates at multiple frequencies.

6. The multiphase controller of claim 1, wherein a selectable current sink is used to make the parameter estimates for the phases.

7. The multiphase controller of claim 1, wherein current sharing logic produces reference current values provided to current loop logic associated with the multiple phases.

8. The multiphase controller of claim 7, wherein the reference current values are different for each phase and used to equalize the power losses of each phase.

9. The multiphase controller of claim 7, wherein the current loop logic for each phase uses at least one estimated parameter to produce duty cycle values for each phase.

10. The multiphase controller of claim 1, wherein each phase is calibrated individually by freezing any other phase.

11. A multiphase controller for a DC-to-DC power supply comprising:
    logic to estimate parameters for multiple phases that provide a combined output at a load, the estimated parameters including a current estimate and an effective resistance estimate for each phase so that a power loss estimate for each phase can be produced, wherein the logic adjusts the operation of the phases using the power loss estimate for each phase, wherein the controller also estimates inductor values for the phases and output capacitance, the inductor and capacitance estimates being used to control the response of the phases to load transients.

12. The multiphase controller of claim 11, wherein the power losses for each of the phases are made more equal using the power estimate for each phase.

13. The multiphase controller of claim 12, wherein the equalization of power losses of the phases effectively equalizes the temperature of the phases without using a temperature sensor.

14. The multiphase controller of claim 11, wherein a selectable current sink is used to make the parameter estimates for the phases.

15. The multiphase controller of claim 11, wherein current sharing logic produces reference current values provided to current loop logic associated with the multiple phases.

16. The multiphase controller of claim 15, wherein the reference current values are different for each phase and used to equalize the power losses of each phase.

17. The multiphase controller of claim 15, wherein the current loop logic for each phase uses at least one estimated parameter to produce duty cycle values for each phase.

18. The multiphase controller of claim 11, wherein each phase is calibrated individually by freezing any other phase.

* * * * *